July 13, 1937.      C. G. MUNTERS      2,086,632
REFRIGRATION
Filed March 30, 1934        15 Sheets-Sheet 7

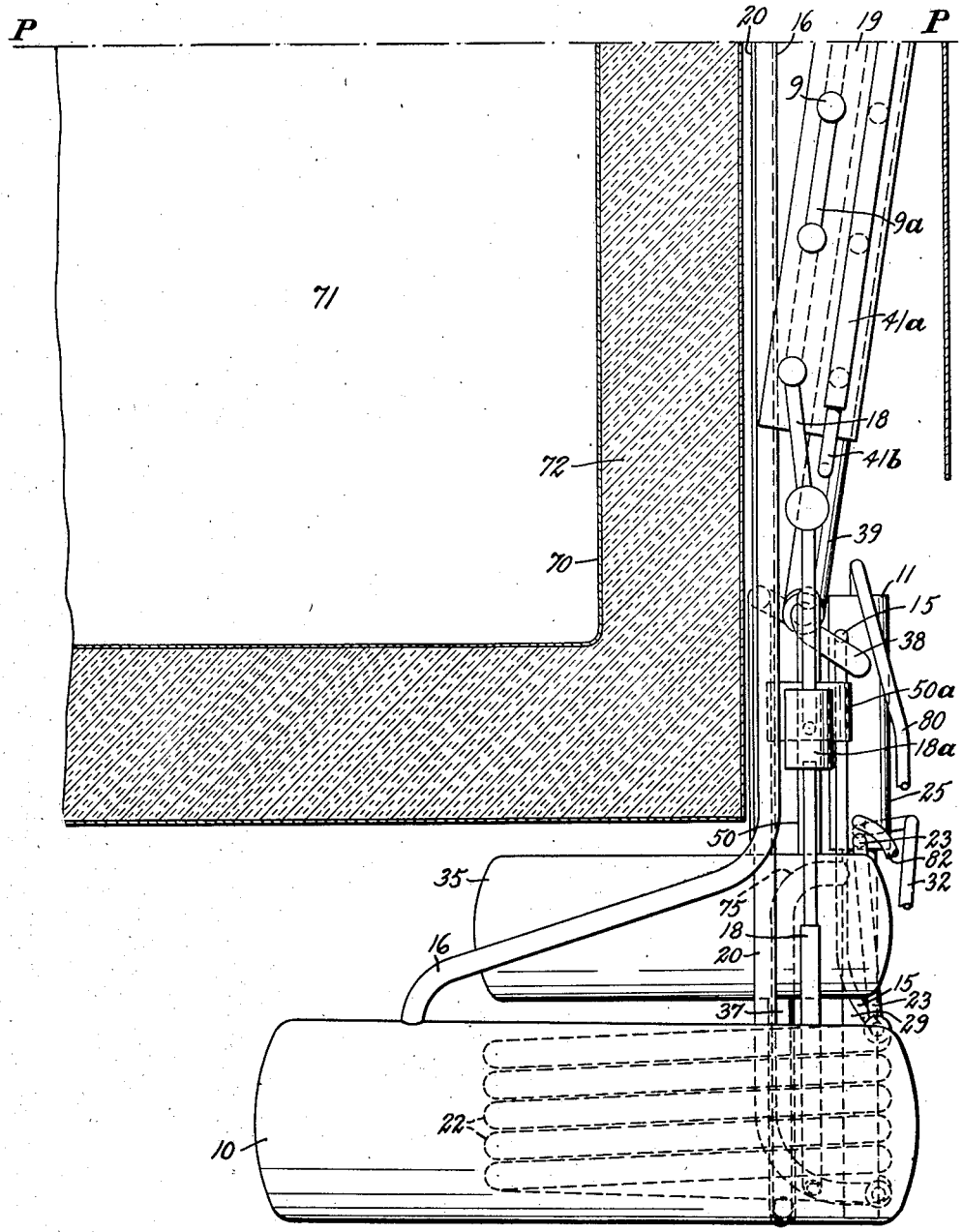

INVENTOR
Carl Georg Munters
BY
his ATTORNEY

July 13, 1937.  C. G. MUNTERS  2,086,632
REFRIGERATION
Filed March 30, 1934  15 Sheets-Sheet 9

INVENTOR
Carl George Munters
BY
his ATTORNEY

July 13, 1937.                C. G. MUNTERS                2,086,632
                                REFRIGRATION
                        Filed March 30, 1934      15 Sheets-Sheet 10

INVENTOR
Carl Georg Munters
BY
his ATTORNEY

July 13, 1937.  C. G. MUNTERS  2,086,632
REFRIGFRATION
Filed March 30, 1934  15 Sheets-Sheet 12

INVENTOR
Carl Georg Munters
BY
ATTORNEY

July 13, 1937.   C. G. MUNTERS   2,086,632
REFRIGFRATION
Filed March 30, 1934   15 Sheets-Sheet 13

INVENTOR
Carl Georg Munters
BY
Wm J Hedlund
his ATTORNEY

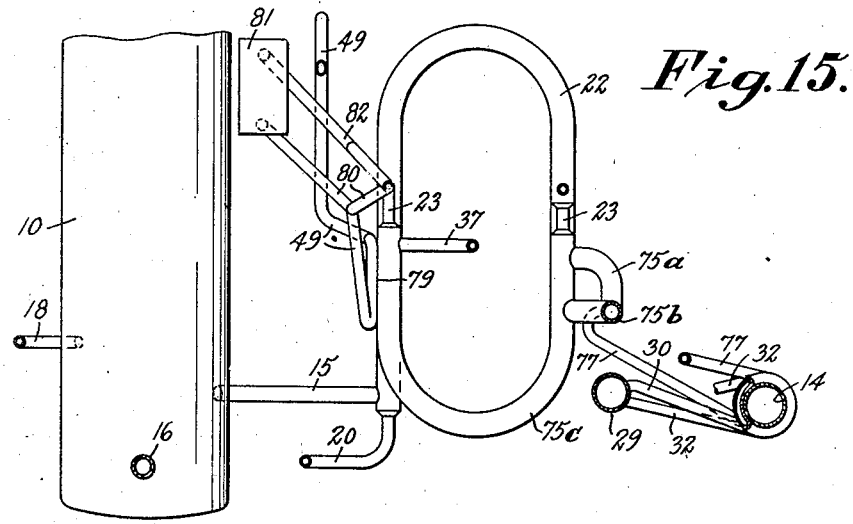
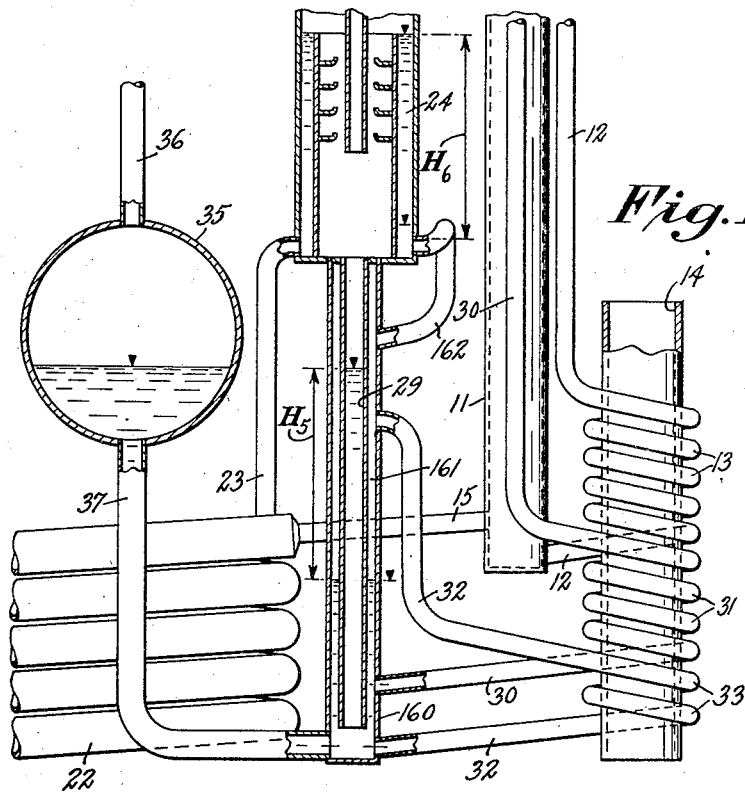

Patented July 13, 1937

2,086,632

UNITED STATES PATENT OFFICE 2,086,632

REFRIGERATION

Carl Georg Munters, Stockholm, Sweden, assignor, by mesne assignments, to Servel, Inc., Dover, Del., a corporation of Delaware Application March 30, 1934, Serial No. 718,136
In Germany December 16, 1933

81 Claims. (Cl. 62—118)

My invention relates to refrigerating systems of the kind having periods of evaporation at low pressure alternating with periods of expulsion of refrigerant and condensation at higher pressure, and in which a small part of the absorption liquid is heated at a time during the expulsion periods while the greater part of the absorption liquid is maintained in cold condition.

Among the objects of my invention are:

To provide means in a system of the type above set forth for quckly raising and lowering liquid to control admission of refrigerant vapor to absorption liquid;

To provide reliable means for governing the liquid column for forcing vapor into the absorption liquid;

To provide an apparatus of the kind referred to which will readily start by mere application of heat, through liquid may be displaced out of the parts in which it is disposed in normal operation;

To provide a minimum temperature variation of the bulk of absorption liquid and avoid heat losses from absorption liquid;

To provide regulation of liquid column height for driving refrigerant vapor into absorption liquid without drawing a considerable amount of liquid out of the circulating portion of the liquid circuit;

To provide constant liquid heads on vapor-lift members actively operating during the expulsion periods;

To provide an improved analyzing effect in a system of the kind set forth;

To provide an improved mode of regulation of the system of the kind set forth;

To minimize the influence of variation of levels on the various parts of the system; and To provide means for precooling refrigerant in such type of apparatus.

Further objects and the nature and advantages of the invention will be understood from the following description of the various embodiments thereof, which description is to be taken in connection with the accompanying drawings forming a part of this specification, of which:

Fig. 5 is a side view of the structure shown in Fig. 3; Figs. 4 and 5 constituting a complete side view of the apparatus when joined on the lines P—P;

Figs. 12 to 15 disclose still another system embodying the invention; and

Fig. 16 shows a modification of a counter-lift employed in the system.

In each of the systems disclosed, the parts are made of suitable metal and the systems are hermetically sealed. For illustrative purposes it will be assumed that the systems are charged with an ammonia-water solution of, for example, 30% concentration. With these fluids the parts may be made of steel pipes and vessels welded together. Other refrigerants may however be used as will be obvious to those skilled in the art after a study of the invention.

Figure 1:
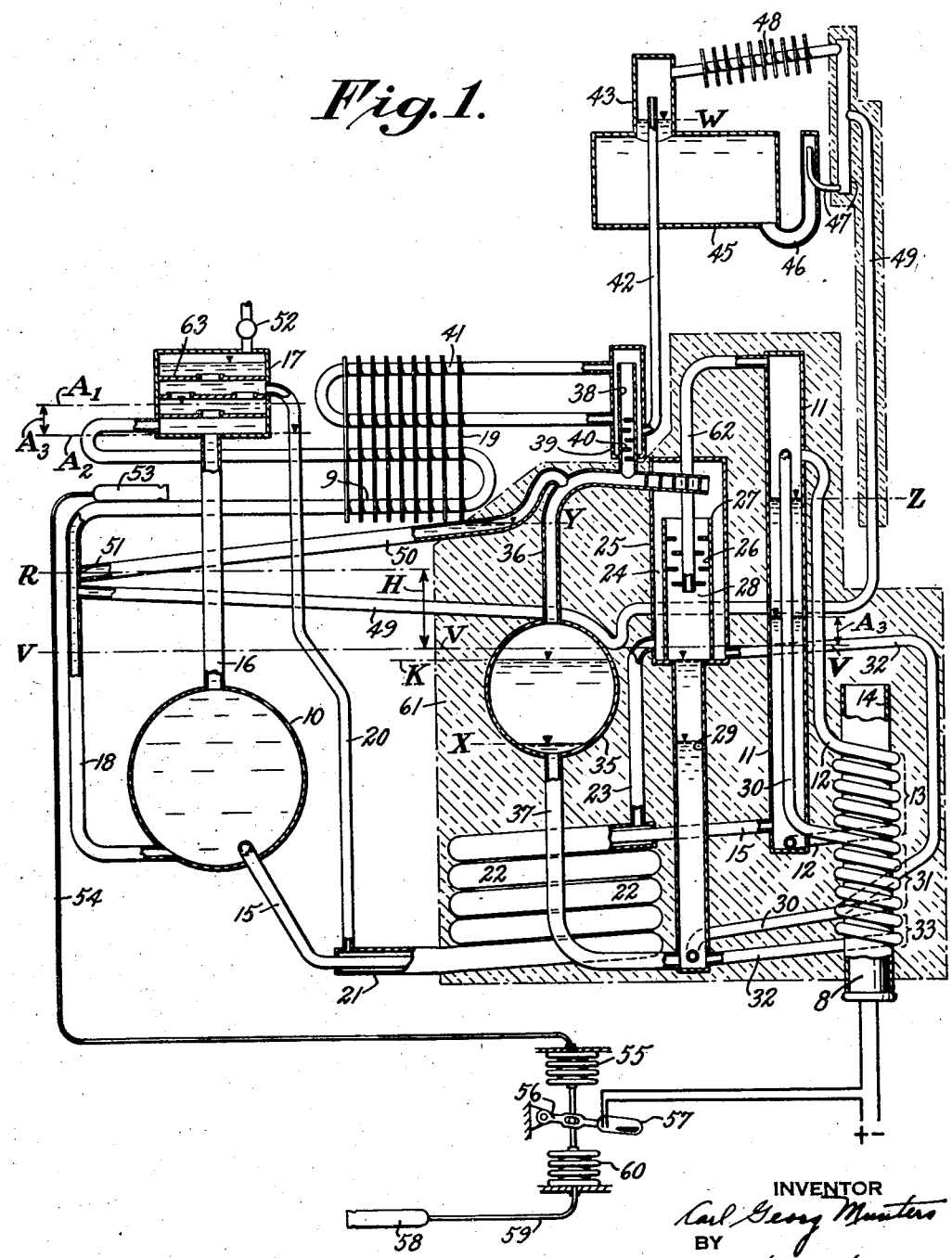
Fig. 1 is a showing, partly in cross-section, of an absorption refrigerating system embodying certain phases of the invention.

The system shown in Fig. 1 includes an absorption liquid reservoir 10 of sufficient volume to hold the bulk of absorption liquid in the system. This reservoir is preferably exposed to the cooling influence of surrounding air. To one side of reservoir 10 is a vessel 11 which may be termed a generator or separator or be considered as a part of the vapor expeller. This vessel is not directly heated, though it may be. In the embodiment illustrated, the contents of vessel 11 are heated by a conduit 12 including a vapor lift coil 13 which is in heat exchange relation with a source of heat such as an electric heater. An electric heater 8 is disposed in a flue or pipe 14. Instead of an electric heater the heated zone may be heated by a gas flame or other source of heat. Conduit 12 is connected at the bottom to the bottom of vessel or tube 11 and at the top to the top of vessel 11.

A conduit 15 is connected to the bottom of vessel 11 and to the bottom of reservoir 10 for flow of weak absorption liquid from the generator or expeller to the storage reservoir 10.

Connected to the top of reservoir 10 is a vertical conduit 16, the upper end of which is connected to a vessel 17 which I will term an excess vapor vessel and which is normally filled or substantially filled with liquid. A conduit 18 is connected to the lower part of reservoir 10 and extends upwardly to connect with vessel 17. This conduit 18 has a horizontal loop constituting an absorption liquid cooling element 9 having heat transfer fins 19 continuously exposed to the cooling effect of atmospheric air. Also connected to vessel 17 is a strong liquor conduit 20.

Parts 16, 17, 18 and 20 constitute an absorption liquid containing structure extending above reservoir 10. This structure is connected to the liquid space of the absorption liquid containing part of the system so that, practically at all times, this structure is filled or substantially filled with liquid due to the fact that, these parts being exposed to atmosphere, the temperature of the fluid therein is such that for the pressures prevailing in the system and in view of the concentration of solution, all the gas can be dissolved and remain in solution form.

The bottom of pipe 20 is connected to a conduit 21 surrounding pipe 15 and forming therewith a liquid heat exchanger 22. A conduit 23 extends between the other end of conduit 21 and the lower part of an annular chamber 24 formed between an outer cylinder or member 25 and an inner cylinder 26. Chamber 24 is closed at the bottom except for conduit connections, and is open at the top. The upper edge of cylinder 26 provides a waterfall or overflow edge 27. The space 28 within cylinder 26 is connected at the bottom with a tube 29. Tube 29 and space 28 form a holder for a down-leg or head column for a gas lift circulator and a counter-lift.

A conduit 30 is connected to the bottom of column tube 29 and is wound around tube 14 to form a vapor-lift or gas lift member 31 in heat exchange relation with the source of heat and thence extends upwardly to connect with the gas separation chamber or generator vessel 11. Both conduits 12 and 30 are connected to vessel 11 somewhat above overflow edge 27. Vapor-lift member 31 is the prime mover for circulation of liquid between the storage reservoir 10 and the generator or source of heat during the heating or expulsion periods.

A conduit 32 including a gas lift or vapor-lift member 33 wound around flue 14 to receive heat therefrom is connected between the bottom of column tube 29 and the bottom of chamber 24. The upper part of conduit 32 inclines downwardly toward chamber 24 to form a resistance trap. Each of the gas lift members is so narrow that a gas bubble substantially fills out the cross section of the tube.

A volume variation vessel 35 is connected by means of conduits 36 and 37 with the upper part of member 25 and the lower part of tube 29.

A conduit 38 extends upwardly from conduit 36 within a rectifier chamber 39 and contains baffles 40. A condenser coil 41 is connected to chamber 39 and is imbedded in the same fins 19 as absorber element 9. Connected to rectifier jacket 39 at a low level is a conduit 42 which extends upwardly and opens at the top within a dome 43 of an evaporator 45. Connected to the evaporator 45 is a draining means including a loop 46. A second loop 47 has an opening within member 46 and is connected at a high point to the dome 43 by means of a conduit 48. Conduit 48 may be equipped with flanges to provide an auxiliary condenser. Connected to pipe 47 about on a level with the lower part of the dome 43 is a conduit 49 which constitutes an overflow conduit and which extends downwardly into heat exchange relation with the volume variation vessel 35 and which is connected with conduit 18 just below a level R. A conduit 50 is connected with conduit 18 at the level R by means of a small aperture 51 and is connected at its upper part to conduit 36. A charging and purging valve 52 is provided in the top of vessel 17 and vessel 35 may be provided with a valve for trimming the charge in the apparatus. A thermostat bulb 53 is arranged in heat exchange relation with conduit 18 above the level R. This bulb is connected by means of a tube 54 with a bellows or other movable member 55 which is adapted by expansion and contraction to tilt a lever 56 on which is mounted a mercury contact switch 57 operative to open or shut electric connections for supplying current to the heater 8. Also acting on member 56 is a second thermostat including a bulb 58, a tube 59, and a bellows 60. Bulb 58 is subject to the temperature of the atmospheric air which surrounds the liquid containing parts of the system including the reservoir 10 and parts 16, 17 and 18 which are not insulated. The purpose of bulb 58 is to take care of variations in temperature of the atmosphere to adjust the action of bulb 53 to the effects of atmospheric or surrounding temperature on the system.

The members 22, 35, 29, 25, 11, and the liquid lift conduits and the immediately associated parts, should be imbedded in insulation 61 as shown.

The amount of liquid contained in the system should be enough to fill the parts 10, 16, 17, 18, 20, and all other parts below the top of reservoir 10 and to such higher level as will fill vessel 35 less the amount of liquid contained in the parts of conduits 16, 18 and 20 and vessel 17 above the top of vessel 35. It is intended that the apparatus will be so constructed that if all the liquid should seek its lowest level it would not rise up to such a level that on subsequent heating absorption liquid would be driven into the evaporator. This level should be preferably slightly below the top of vessel 35. The vessel 35 should be of sufficient capacity to hold as much absorption liquid as is contained in the system in normal operation at the end of the heating period above the point of connection of pipe 23 with chamber 24.

I believe the invention will be best understood by beginning with the description of the absorption period. Assume that the evaporator 45 is filled to the level W with substantially pure liquid ammonia. Assume that the heat has just been shut off. The level in the volume variation vessel 35 is near the bottom thereof as at X. The heating and vapor-lift action having stopped, the liquid will seek its lowest level in all spaces which are in open gas and liquid communication and therefore any liquid in chamber 24 will flow downwardly or try to flow downwardly through conduit 32, displacing liquid into the volume variation vessel. Likewise the two higher levels prevailing during the previous heating period at Y and Z in pipe 50 and vessel 11 respectively, will seek the common level and will drop. The liquid in vessel 11 will flow downwardly therein and through conduit 15 to reservoir 10. There being liquid in the structure above reservoir 10 this will mean that, as in an ordinary syphon, this liquid, or liquid displaced thereby, will flow upwardly in pipe 16, downwardly through pipe 20 and through pipes 21, 23 and thence through pipe 32 into pipe 37 and the volume variation vessel 35. The liquid in pipe 50 will likewise seek its level and will flow downwardy therein and likewise liquid will be displaced from the pipes connected with reservoir 10 through pipe 20 and through the same path as just described to the volume variation vessel. When the level in pipe 50 has fallen down to the level R gas can enter through the hole 51. The hole 51 is now in direct gas receiving communication with the evaporator 45 through the conduits 50, 36, 38 and 42.

Gas entering pipe 18 through aperture 51 will flow upwardly therein causing circulation of absorption liquid through pipes 18 and 20 and vessels 10 and 17. Since there is liquid in the pipe 18 all the way up to the vessel 17, the pressure is less and less going up in the liquid column and the gas will naturally go upwardly within this pipe to the lesser pressure space. The gas flowing upwardly in conduit 18 is absorbed in the weak liquid therein and, unless too much gas is admitted, the rejection of heat through absorber fins 19 will be sufficient so that the gas may be entirely absorbed and due to the arrangement and temperature of the vessel 17 and pipes 18, 16 and 20 they will continue to hold liquid above the level R.

In order to sustain inflow of gas through aperture 51 into pipe 18 it is necessary that there be a higher pressure on the gas than the pressure at the opening 51 within pipe 18. This higher pressure is obtained without the use of a liquid trap between the generator and the evaporator as follows: The liquid has now fallen in chamber 24 to a level below the level R and we may consider that it has fallen to the level V, namely the point of connection of conduit 23 with chamber 24 and the high point in conduit 32. The pipe 23 contains liquid, which liquid is unbroken through conduit 21 and pipe 20 and through the vessel 17 and through pipes 16 and 18 to the aperture 51. This unbroken liquid communication also extends through pipe 15 to the contents of the separator vessel 11. Consequently we may consider that we have a U-tube containing liquid in which the left-hand branch of the U-tube has a level up to R and the right-hand branch has a level up to V. The liquid above the level R need not be considered because that equalizes in pressure through itself. Consequently the difference in height which is represented by H between the level R and the level V represents the height of liquid column preponderance on the left-hand side and consequently the pressure on the gas just above the liquid in chamber 24 is higher than the pressure at the level R within pipe 18 by the amount of the head H. Pressure is transmitted equally through gas and therefore this pressure may be said to act upwardly within chamber 24 and on to the gas which is in pipe 50 to force it into the conduit 18. Another way of looking at it is that the temperature of the parts 17, 20, 16 and 18, in view of the concentration of solution therein, causes the liquid to be held up in these parts, so to speak, by suction, wherefore, with respect to the level V, there is a suction or reduced pressure at the higher level R due to this level being at a higher point in the liquid system and due to the fact that the only differences in pressure are those occasioned by different heights of liquid. It might be thought that the gas in aperture 51 would expand and allow liquid to fall down in pipe 18 but there is a local circuit including pipes 18 and 16 and vessels 10 and 17 so that when gas is introduced into pipe 18 the heavier solid column of liquid in pipe 16 tends to push downwardly into the vessel 10 and upwardly through the bottom part of pipe 18. This might be explained by stating that the bubble entering through the aperture 51 is like a cork introduced below the surface of a body of liquid. The level in vessel 11 will likewise be at the level V during this time. Conduit 18 need not be so wide that bubbles fill out the width thereof.

The condition now is that there is a higher gas pressure in the vapor space including conduits 50, 36 and 62 and chamber 25 and the upper part of vessel 11, represented by the low level V, than in the pipe 18 at aperture 51 and thus, since the gas will flow from the higher to the lower pressure, gas will flow both from the generator and from the evaporator to the absorption liquid circuit through pipe 50. The withdrawal of gas from the chamber 35 and vessel 11 serves the purpose of reducing the pressure and effecting cooling of the liquid contained within the parts imbedded in insulation. It is necessary that the vapor pressure of the solution imbedded in insulation be brought down in order that evaporation will take place in the evaporator, sufficient to produce refrigeration. Thus I provide a means for rapidly bringing down this pressure without the utilization of an external cooling medium applied to the liquid within the insulation or what may be termed the liquid within the hot part of the system during the heating period. Another factor of importance is that the withdrawal of gas from above the surface of liquid in the chamber 24 and in vessel 11 will result, at the beginning of the absorption period, and continuing throughout a substantial portion thereof, in continued ebullition of liquid in the pipes within the insulation, thus still further facilitating the withdrawal of gas from all the liquid contained within the insulation. The residual heat in the insulation and in the metal parts imbedded in the insulation together with the reduction in pressure in the gas space will cause continued ebullition in the gas lift members 13, 31 and 33 and other liquid containing parts after the heat has been shut off, thus bringing all the warm liquid quickly into contact with the gas phase. Inasmuch as the gas space in the evaporator and the gas space above the warm liquid in the insulation are both in direct communication with the same absorption factor and acted on by the same pressure, pressure cannot exist in the insulated parts so as to adversely affect or stop evaporation.

The entry of gas into conduit 18 causes a local circulation of absorption liquid upwardly in conduit 18 through the absorption liquid cooling element 9 into the vessel 17 downwardly through the conduit 16 through the reservoir 10 and back into the conduit 18. Thus the liquid in the reservoir 10 is gradually enriched. There will not be violent movement of liquid within the reservoir 10 but we may consider that the separation between the rich liquid and the weak liquid gradually descends in the reservoir 10 until all the liquid therein becomes enriched. During the absorption period, the absorbed refrigerant increases the volume of absorption liquid corresponding to the amount of refrigerant absorbed. This increase of absorption liquid is taken care of by overflow from the absorber circuit 10, 16, 17, 18, through conduits 20, 21 and 23, and through conduit 32 and conduit 37 into the volume variation vessel 35. At the end of the absorption period, the vessel 35 should be substantially filled with absorption liquid to about the level K. In this overflow, the level in vessel 35 will stand approximately the same as the level in conduit 32 and therefore there is an overflow or waterfall between the top bend of conduit 32 and the level therein corresponding to the level in vessel 35. By means of this waterfall the variation of liquid level in vessel 35 is isolated from the absorption liquid circuit.

An apparatus of this kind has a very rapid drop in pressure at the beginning of the absorption period, and since the body to be cooled which is in heat exchange relation with evaporator 45 is warm at this time, there will be an intense evaporation of liquid refrigerant and more gas may pass through aperture 51 than can be taken care of by the cooling provided by absorber 9. It is therefore desirable to govern or regulate the rate of absorption and consequently rate of gas supplied to the absorption liquid circuit. If some means were not provided to slow down this absorption liquid circulation, so much gas might enter the liquid containing structure above reservoir 10 that the liquid would be pressed down to break the circulation circuit through conduits 18 and 16 (assuming for the moment that the conduit 20 were not connected at its upper end to vessel 17) and a break in the local absorption circuit would prevent further absorption until such time as the refrigerant gas became absorbed, which could not very well take place when the circulation has stopped. Should the liquid surfaces in pipes 16, 18 and 20 fall below aperture 51, the circulation of absorption liquid through these pipes cannot restart without initiating a new expulsion period to raise the liquid in chamber 24. I provide a means for maintaining this circulation by connecting the pipe 20 to the vessel 17. This connection is preferably made above the points of connection of conduits 16 and 18 therewith. The conduit 20 is connected directly with space 24 through the pipes 21 and 23. There is a waterfall at the top point of conduit 32 wherefore there is a constant level with respect to the liquid within conduits 20, 21 and 23. The regulation can be effected by varying the effective driving head H, but this cannot be done by varying the level in chamber 24 in view of the overflow. However, a variation of liquid column affecting the absorption liquid circulation can be obtained in the U-tube represented by conduits 20, 21, and 23 by varying the left-hand branch. The possibility of doing this means that it is not necessary to use a large volume of liquid to produce a variation in driving head as would be the case if it were necessary to raise the liquid in vessel 35 to accomplish this.

Assume now that more gas enters conduit 18 than can be absorbed due to heat dissipation from fins 19. This gas will flow upwardly through the absorber cooling element 9 and will collect in the upper part of excess vapor vessel 17 and will depress the liquid therein. If this liquid is depressed to below the point of communication of pipe 20 with vessel 17, and the surface of liquid remains within vessel 17, it will be seen that there can still be liquid communication between pipes 16 and 18 so that the liquid circulation through pipes 18 and 16 can continue. However, when the gas enters the pipe 20, the column of liquid in pipe 20 is reduced, and since the liquid overflow height in pipe 32 is constant, there will be a lesser head acting on the gas in chamber 24 due to the liquid column in pipe 20 above the overflow edge in pipe 32 being lessened. The same gas accumulated in the upper part of vessel 17 will tend to depress liquid downwardly in the pipes 16 and 18 but liquid depressed in these pipes displaces liquid through pipe 15 and into the vessel 11 and since there is no overflow for the liquid from this vessel during the absorption period the level or surface therein will rise as the level lowers in conduit 20. This rise of liquid in vessel 11 decreases the liquid column in pipes 16 and 18 acting upon the gas in vessel 11 which is at the same pressure as gas in chamber 24. When the gas in chamber 17 has depressed liquid to below the point of communication of pipe 20 therewith, there will be substantially no further depression of liquid within chamber 17 on account of the rise of liquid in vessel 11, whereas the gas may depress the liquid to a lower level in pipe 20 on account of the constant overflow in conduit 32. The amount that the liquid is depressed within vessel 17 below the point of communication of conduit 20 therewith corresponds to the volume of liquid which is raised within generator vessel 11 above the level V. The vessel 11 is of less horizontal cross section than the vessel 17 and consequently a small height within vessel 17 below the point of connection of conduit 20 therewith represents a higher variation in level in vessel 11. The maximum height to which the level can be raised in the vessel 11 and lowered in conduit 20 relative to the level in vessel 17 is the height H because at this point the rise of liquid in vessel 11 and lowering of liquid in conduit 20 has equalized the column difference between the levels R and V which was produced to cause circulation.

Assume that the liquid in vessel 17 has been depressed so that it stands at $A_1$ and the surface of liquid in pipe 20 stands at the level $A_2$. The difference between these levels is represented by the height $A_3$ and this same height $A_3$ will be the amount that the liquid is raised in the vessel 11. The pressure difference on the two sides of the aperture 51 has now been reduced by an amount equivalent to the height $A_3$. Another way of putting it is that the liquid column acting on the gas in conduit 50 has been reduced due to the rise of liquid level in vessel 11 and the lowering of liquid level in conduit 20 by an amount equal to the column $A_3$. Thus the effective driving force for the absorption liquid circulation is now equal to the difference between the column H and the column $A_3$. The reduced pressure difference causes less gas to flow through aperture 51 without stopping the circulation of liquid through conduits 18 and 16 and thus time is provided for the gas to be absorbed so that the liquid rises again in vessel 17. Of course, if the reduction in driving head should increase to the maximum amount, equal to the column H, the circulation will stop, but, due to the low temperature prevailing in vessel 17, the gas will be absorbed and the circulation will start again. The discs 63 within chamber 17 assist in absorbing the gas by holding absorption liquid thereon. Thus the driving head for forcing gas into the absorption liquid circuit is automatically regulated to suit the absorption capacity and this is accomplished by a means separate from the local absorption circuit so that this circuit can function to obtain the best absorption effect. Furthermore the regulation is accomplished with a very small quantity of liquid and without causing a variation of liquid head in the volume variation vessel or other wide member of the system. Regulation takes place in the same manner if vapor forms in vessel 17 due to lowering of pressure.

I prefer to connect the pipe 20 with vessel 17 some distance below the top thereof so that the upper part of vessel 17 can constitute a dead space for accumulation of any extraneous gases which may find their way into the apparatus in the filling process or which may be develped therein during the operation of the apparatus. Such extraneous gases may be purged out by means of the valve 52. The foreign gases collected in the upper part of vessel 17 have no effect on the absorption so long as these gases form not more than a volume filling vessel 17 above the point of connection of conduit 20 thereto at the lowest pressure prevailing in the apparatus. Thus an adequate space can be here provided for taking care of foreign gases without having them adversely affect the operation of the apparatus. The apparatus preferably contains corrosion preventing materials such as sodium chromate.

The absorption period continues until the gas is substantially entirely evaporated from the evaporator 45 and this vessel is substantially empty. When no more gas or very little gas enters conduit 18 through aperture 51, the bulb 53 will drop in temperature toward room temperature and when this occurs the fluid within bulb 53, conduit 54, and bellows 55 will contract and tilt the regulator 57 to cause current to be supplied to the electric heater 8 and thus start the expulsion period.

A primary consideration for the operation during the expulsion period is that the communication between the gas space of the system and the absorption liquid circulation circuit, through conduit 50, be closed. This I accomplish by means of the vapor-lift or gas lift or counter-lift member 33 and the conduit 32. During the absorption period, some liquid flows through the conduit 32 from the chamber 24 downwardly to the bottom of column 29. During the heating period, vapor is expelled from solution in the coil 33 due to the heat and since there is a high column of unbroken liquid in the tube 29, the vapor formed tends to rise in tube 32. There is thus a lifting action imposed on liquid in tube 32 and liquid is conveyed upwardly to chamber 24. This liquid cannot flow through conduit 23 (at least as soon as liquid is raised to level Z in vessel 11, which is accomplished primarily by vapor-lift 31) since this conduit 23 has no place permitting expansion or receipt of liquid and therefore the liquid, so to speak, piles up in the chamber 24 and rises up to the overflow edge 27. It can rise no higher than the overflow edge 27 because on reaching this height it overflows into the tube 29. Thus there is set up a local circulation from tube 29 through conduit 32 and vapor-lift coil 33 and upwardly in chamber 24 over the overflow edge and back down into the column or tube 29. The rise of liquid in chamber 24 (and vessel 11) exerts a pressure influence in the liquid part of the system communicating therewith. This pressure influence communicates through the conduit 23, conduit 21, conduit 20 and vessel 17 into conduit 18 and raises the pressure in conduit 18 at aperture 51 relative to pressure in conduit 50 so that liquid is forced out from conduit 18 through aperture 51 and the liquid rises in conduit 50 to the height Y which is at substantially the same level as the overflow edge 27. Looking at it another way, there is gas communication between the surface of liquid in chamber 24 and vessel 11 and the surface of liquid in conduit 50 and therefore these three liquids, being in unbroken liquid communication, will seek the same level. Thus the conduit 50 is closed up by liquid so that gas is prevented from entering the absorption liquid circuit.

Simultaneously the coil 31 is heated. The production of vapor in this coil causes flow of liquid upwardly therein and through conduit 30 into the member 11 where vapor is separated from liquid. The liquid flows downwardly in member 11 and thence through conduit 15 and into the storage vessel or reservoir 10. Liquid further circulates through conduit 16, vessel 17, conduit 20, conduit 21, conduit 23, and upwardly through chamber 24 and into the column 29. In order for the liquid to flow by gravity through the conduits, the level will be higher in chamber 11 than the overflow edge 27. Thus the coil 31 produces circulation between the reservoir 10 and the generator. Simultaneously the coil 13 is heated and vapor expelled therein, which vapor causes circulation from the lower part of member 11 through conduit 12 and to the upper part of member 11. This is a local circulation for expelling refrigerant from solution. Coil 13 is provided so that vessel 11 need not be heated and can be as narrow as possible to hold a minimum of liquid. If vessel 11 were narrow and heated, liquid would be boiled upwardly carrying liquid into the vapor line. The absorption liquid is heated a little at a time, under substantially continuous circulation, the refrigerant vapor being expelled, and the residual weak liquid passes back to the reservoir 10 while preheating the rich liquid passing through conduits 20, 21, and 23 to the generator and itself being cooled and stored in the reservoir. It will be seen that the heat exchanger is separated from the zone of outside heat.

Pipe 16 may be provided with cooling flanges in order to air-cool liquid passing from the reservoir 10 to the expeller. For this purpose, pipe 16 may be extended through the fins 19. This will also provide additional cooling in the absorber circuit of the absorption period. Also, or alternatively, fins may be provided on conduit 20 for additional cooling of the liquid circuit of the expulsion period.

The expelled refrigerant passes through conduit 62 and passes upwardly within chamber 28 where it meets downflowing solution flowing over the overflow edge 27. This provides an analyzing of the vapors expelled in the generator which serves to remove entrained water vapor. Vapor expelled from the absorption liquid passing upwardly in conduit 32 passes upwardly in member 25. The vapor from all the vapor-lift coils passes from the top part of member 25 into conduit 36 and through conduit 38 to the condenser 41. As the refrigerant vapor is driven off the level lowers in vessel 35.

In the condenser 41, the refrigerant vapor is condensed and it flows downwardly into the rectifying pocket 39. The condensed liquid ammonia acts to cool the vapor passing through conduit 38 to further condense out entrained water vapor. Due to the fact that the member 39 contains liquid refrigerant at the same pressure as within the pipe 38, pure ammonia cannot be condensed in this rectifier. The liquid refrigerant is forced upwardly through conduit 42 and overflows into the evaporator 45 where it accumulates. Vapor carried upwardly in conduit 42 is condensed in condenser member 48.

The liquid refrigerant continues to accumulate in the evaporator 45 until some of it overflows through the conduit 49. Any absorption liquid carried into the evaporator will settle to the bottom thereof and will be carried out first through the drain 46, 47. The absorption liquid does not have a very low boiling point and overflow of absorption liquid has no effect or is not effected by the warmer vessel 35 with which conduit 49 is in contact. It will be appreciated that vessel 35 is maintained at a temperature between the temperature of vessel 11 and the temperature of reservoir 10. When, however, liquid ammonia overflows into conduit 49 this liquid will be vaporized in that part of conduit 49 which is in heat exchange relation with vessel 35 because the vessel 35 is at higher temperature than the prevailing condenser temperature. The formation of ammonia vapor in conduit 49 causes passage of gas into conduit 18. This ammonia gas is absorbed in absorption liquid in conduit 18 and the rejection of heat of absorption causes a rise in temperature in conduit 18 above the point of connection of conduit 49 therewith which causes a rise of temperature of bulb 53 sufficient to expand the bellows 55 and to tilt the mercury switch 57 or other switch employed to shut off the heat.

When the heat is shut off, the conduits 30, 32, and 12 cool quickly to the point where expulsion of refrigerant vapor substantially ceases and consequently the column of liquid maintained in chamber 24 falls and vapor is thus admitted through pipe 50 into the pipe 18, thus starting the absorption period. The arrangement should be such that the coil 33 can cool off while the bulb 53 is maintained warm due to the introduction of ammonia vapor into conduit 18 from conduit 49. No matter how the apparatus is arranged there will be some lag. The lag can be adjusted to the cooling of the coil 33 by the amount of insulation around the coil 33. A snap action mechanism may be applied to the mercury switch 57.

Should the bulb 53 not be maintained warm for an appreciable period so that heating starts again, this will make no difference, since more refrigerant vapor will be expelled and eventually enough pure liquid ammonia will overflow from the evaporator to cause sufficient heating of the bulb 53 so that the heat will be cut off for a sufficient period to allow the liquid column in chamber 24 to fall and permit gas to enter conduit 18 through pipe 50. As soon as gas enters conduit 18 through pipe 50 the bulb will be heated sufficiently to maintain the heat closed off.

It will be seen that the amount of liquid contained in the portion of the system exposed to outside heating is very small compared to the amount of liquid contained in the system. As soon as the vapor begins to pass through conduit 50, vapor will be withdrawn from the residual warm liquid within the insulation and this liquid will be cooled off very quickly so that the absorption period can start effectively in a very short time.

Figs. 2 to 5a show an actual apparatus embodying the invention. Like reference characters have been used to designate like parts with respect to Fig. 1. The apparatus is shown as mounted in a cabinet comprising a liner 70 forming the border of a food space 71. Outside the liner is insulation 72. The apparatus is situated below and to the back of the food space, except for the evaporator structure of which the vessel 45 and associated parts are imbedded in the insulation 72 and a heat transfer system attached thereto extends within the food space 71 and is mounted on a removable portion 73 of the refrigerator cabinet whereby the unit as a whole can be withdrawn from the rear.

Figure 2:
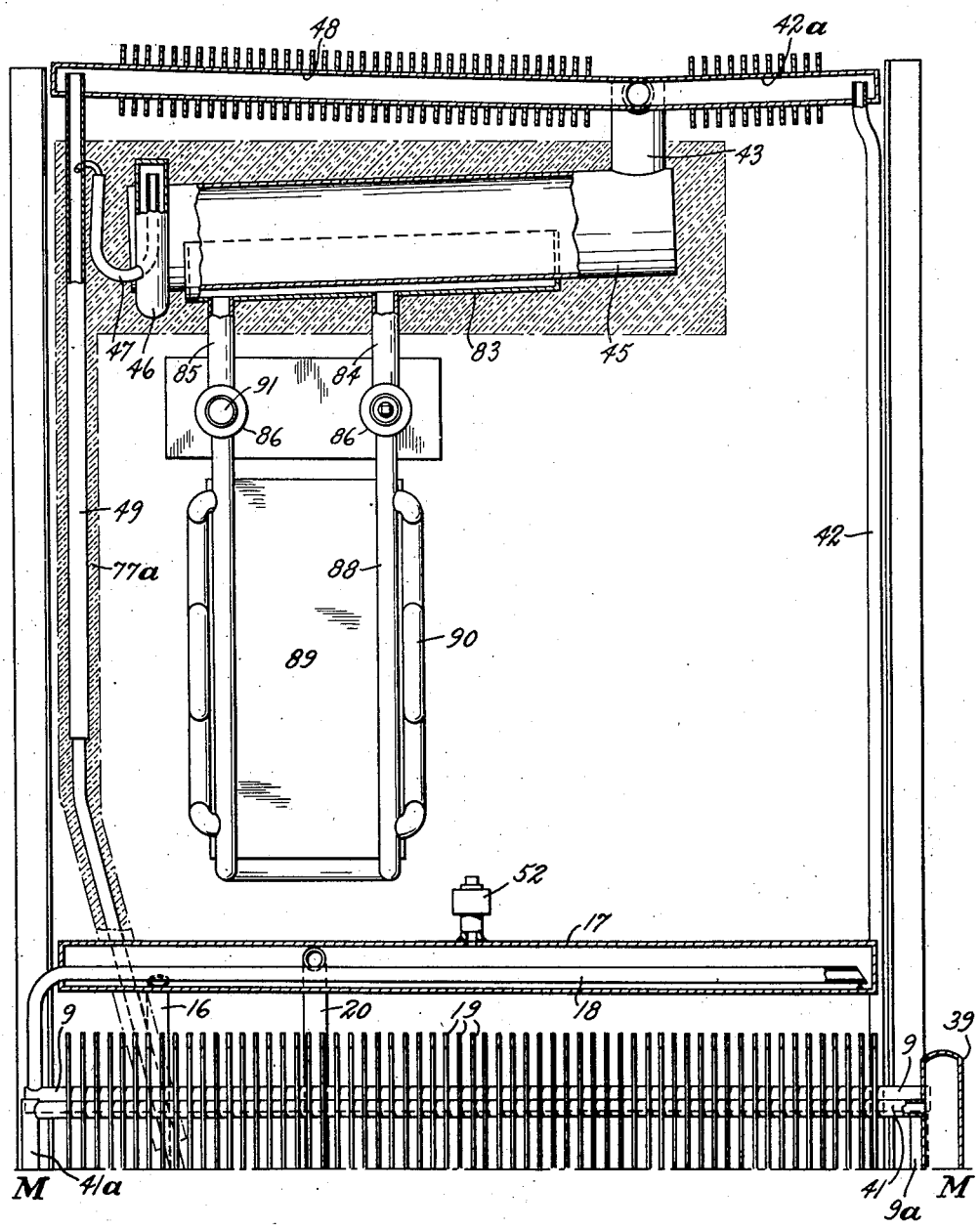
Fig. 2 is a back view of the upper part of an actual apparatus built in accordance with the present invention.
Figure 3:
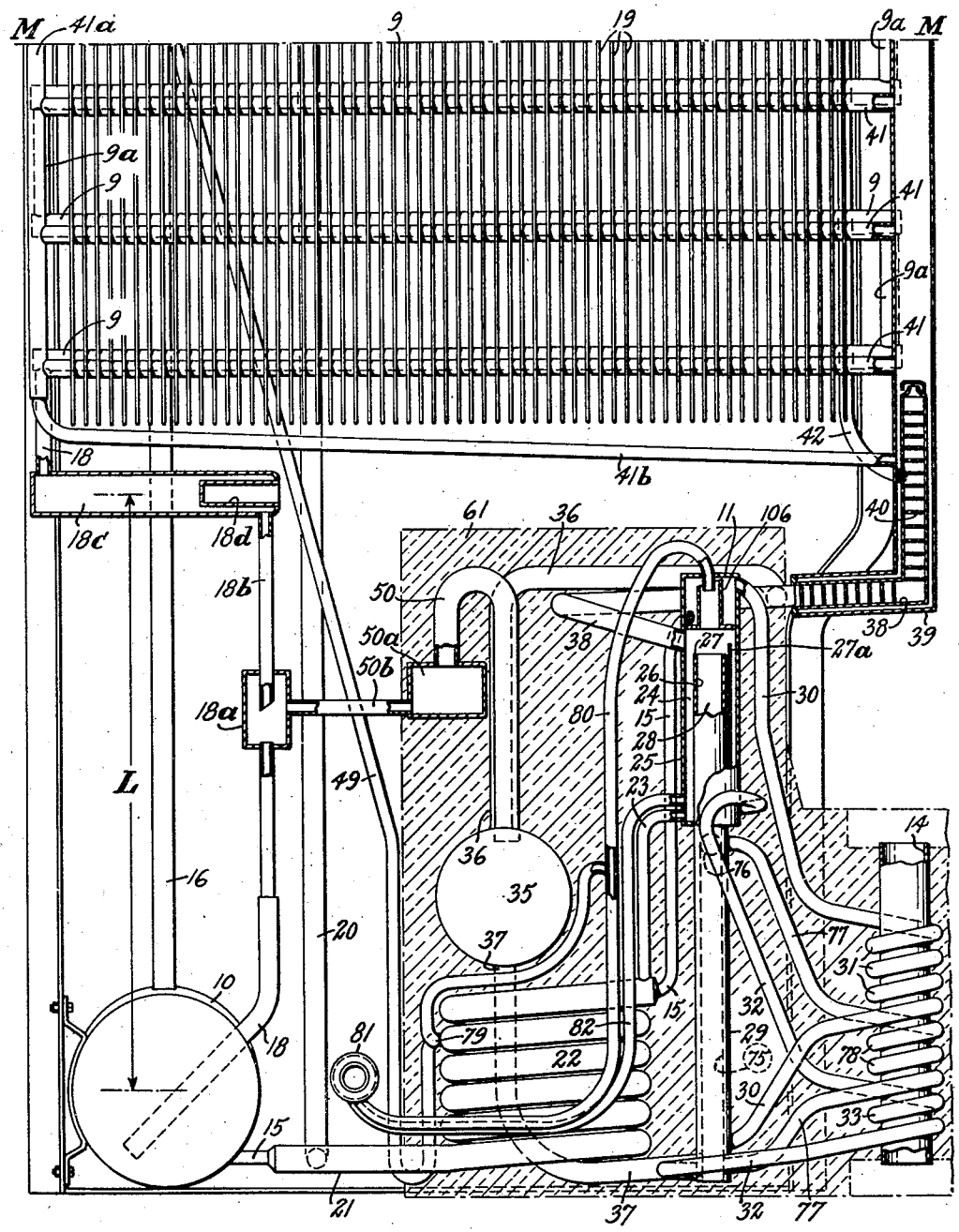
Fig. 3 is a back view of the lower part of the apparatus of Fig. 2, Figs. 2 and 3 constituting a single elevational view when joined on the line M—M.
Figure 4:
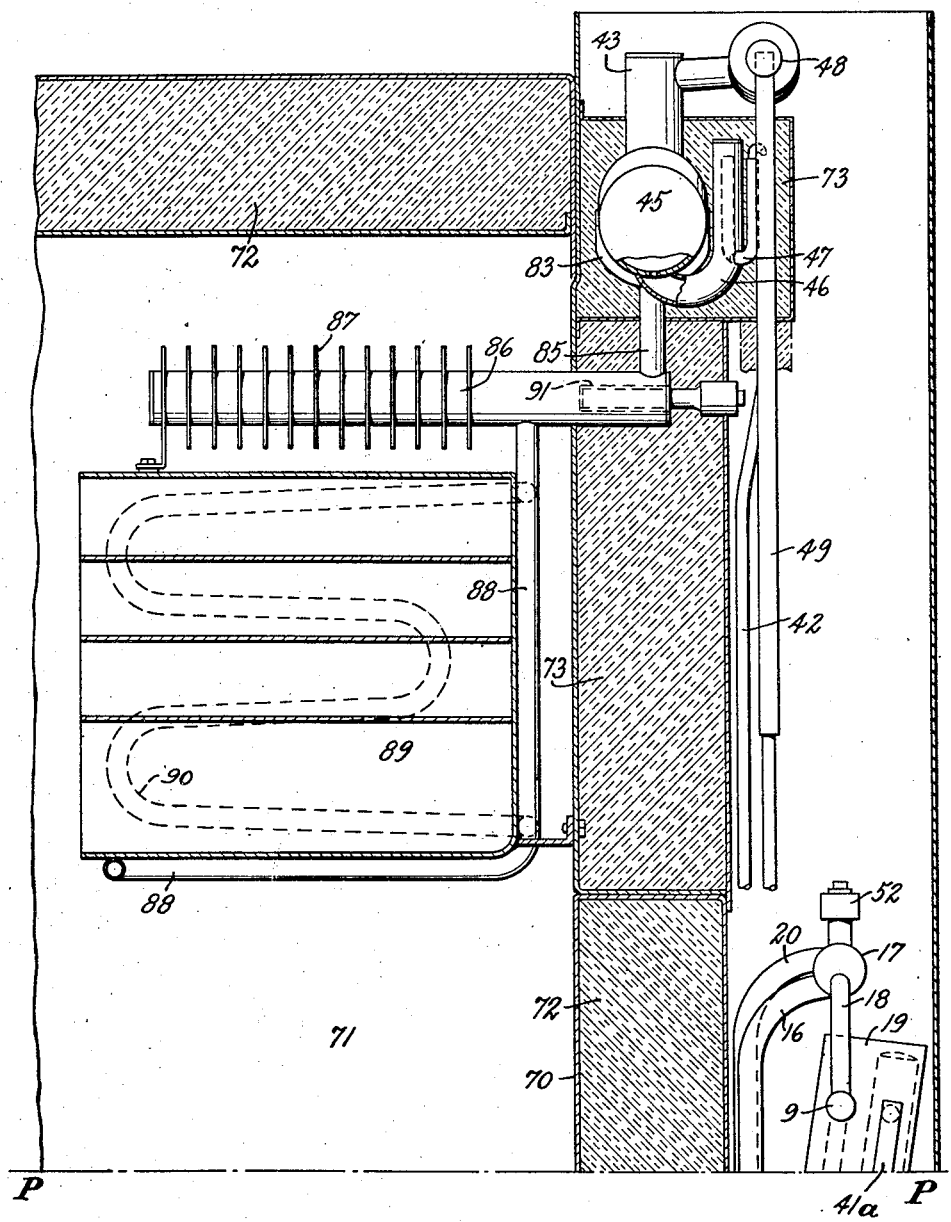
Fig. 4 is a side view of the structure shown in Fig. 2.
Figure 5A:
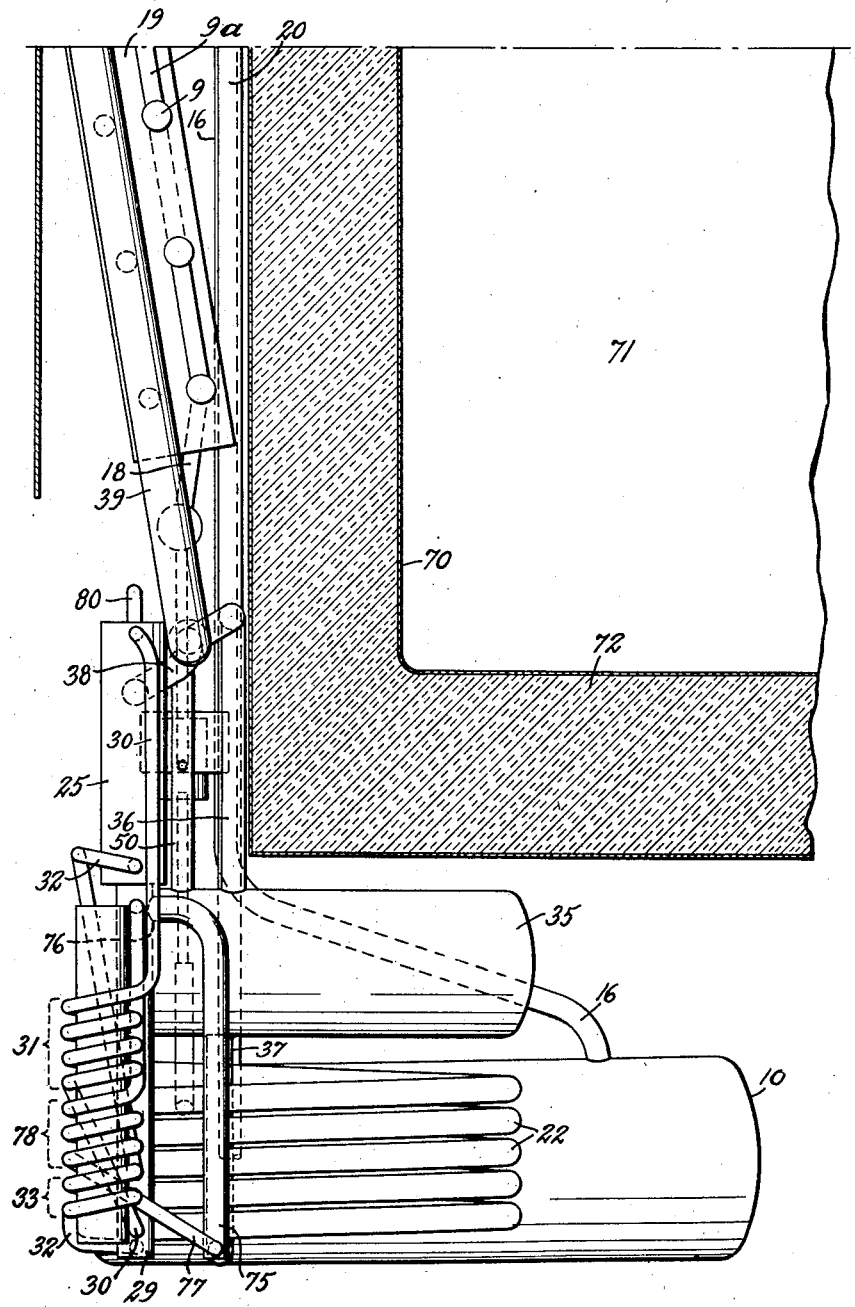
Fig. 5a is a view from the opposite side of the structure shown in Fig. 3.

The reservoir 10 is a relatively large cylindrical vessel disposed below the food space. The separating space or gas separation chamber 11 is situated above the chamber 24. A conduit 15 extends from vessel or chamber 11 downwardly through heat exchanger 22 and to the bottom of reservoir 10. The same parts as in Fig. 1 are imbedded in insulation. A conduit 16 extends upwardly from the reservoir 10 and is connected to the excess vapor vessel 17, which is shown in Figs. 2 and 4 and which extends substantially the width of the refrigerator. The conduit 18 extends from within the reservoir 10, opening near the bottom thereof, upwardly to a chamber 18a into which the vapor is introduced from the conduit 50 connected with the evaporator and the gas separation chamber. From chamber 18a, a narrow pipe 18b, so narrow that gas bubbles therein substantially fill out the cross section, extends upwardly to a member 18c having a pocket 18d which may hold a thermostat bulb if a regulation is used as shown in Fig. 1. However, in this actual apparatus a different form of regulation was used, as will be hereinafter explained. The pipe 18 continues upwardly from member 18c and extends within the vessel 17 to the right-hand end thereof as shown in Fig. 2. Interposed in the conduit 18 is the absorber 9 which consists of a plurality of horizontal pipes connected at the ends by vertical pipes 9a and imbedded in fins 19. The absorber 9, 9a, 19 is situated in a natural draft flue at the rear of the cabinet.

Figure 6:
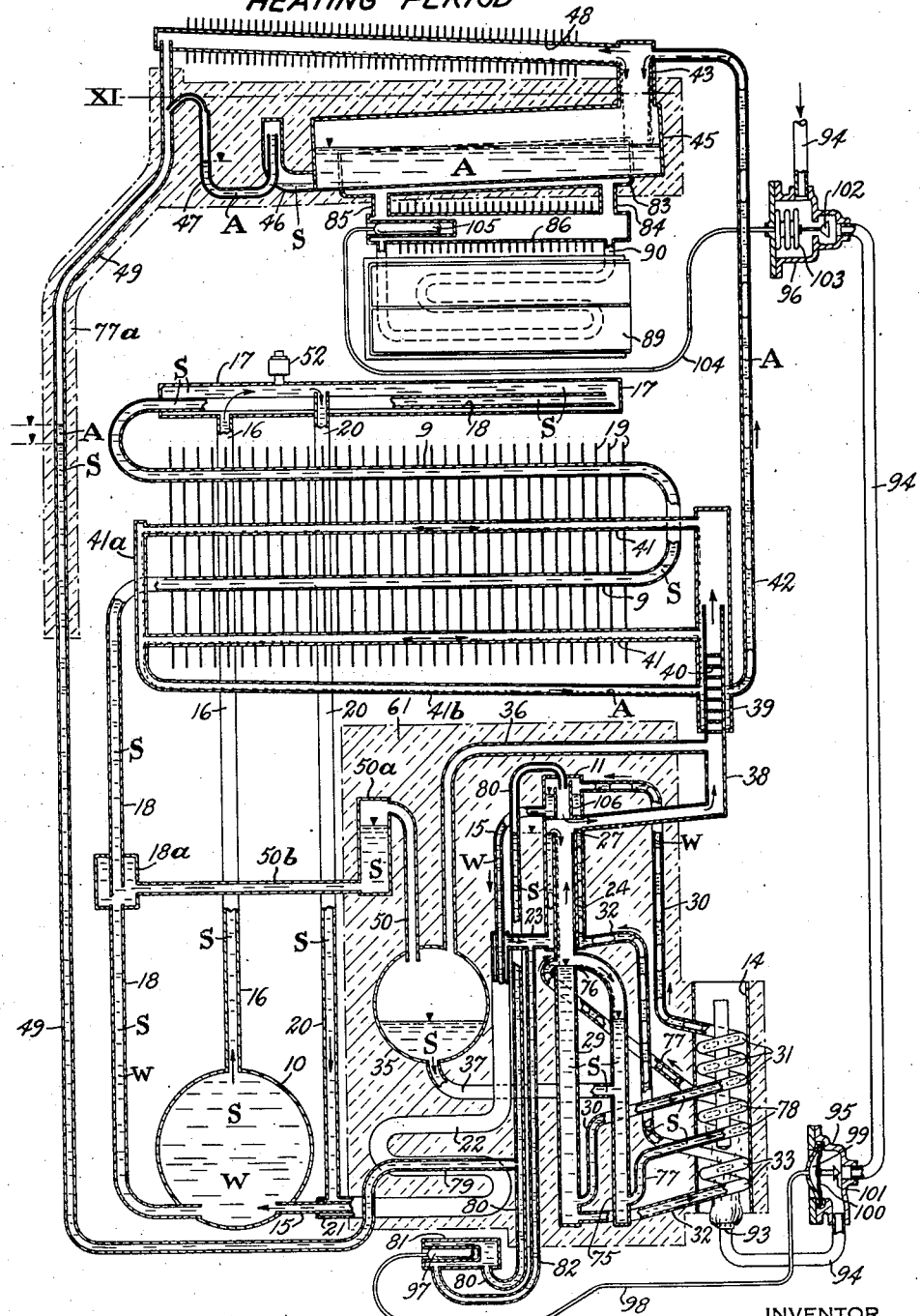
Fig. 6 is a diagrammatic showing of the apparatus of Figs. 2 to 5 illustrating the action during the heating period.
Figure 7:
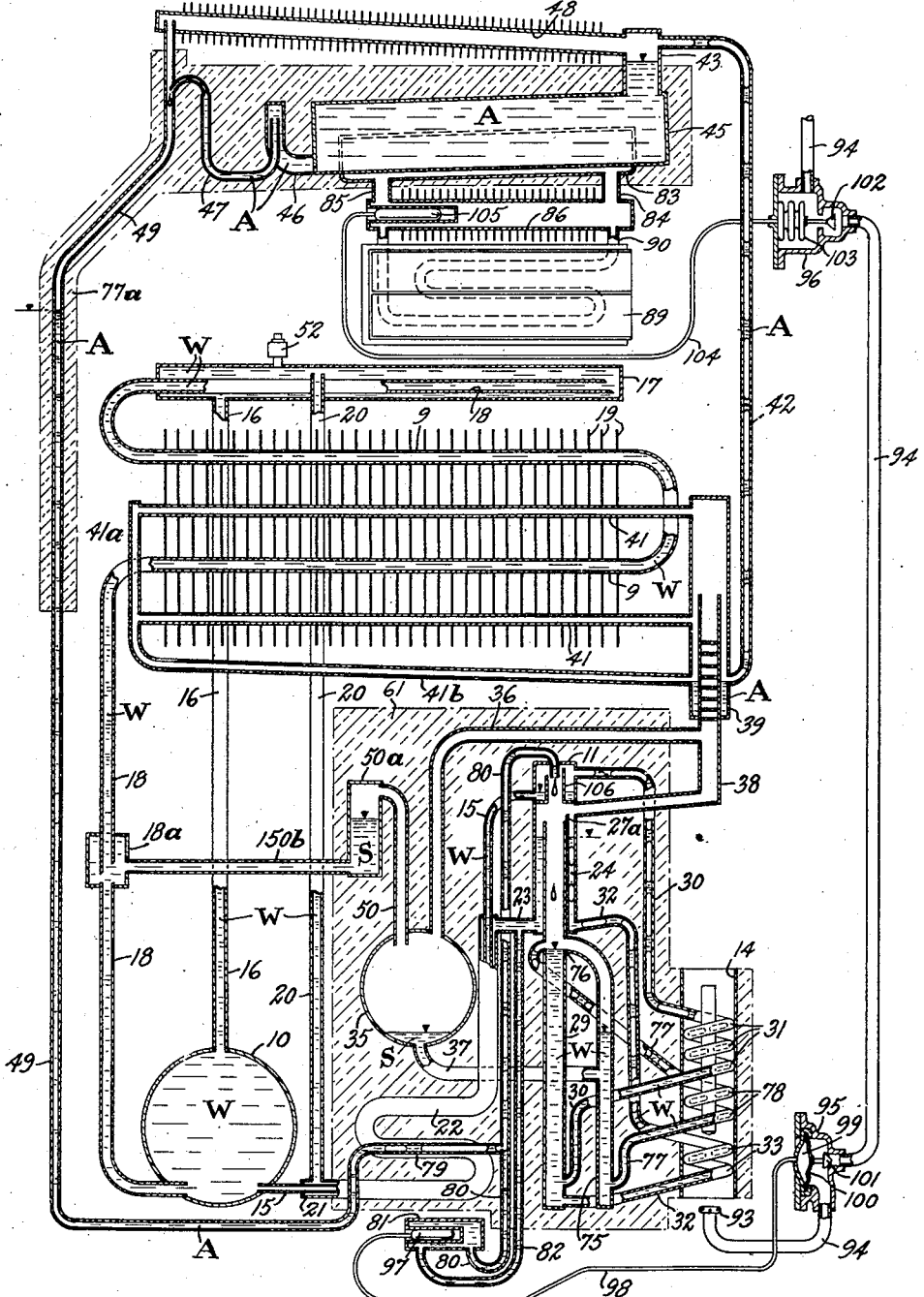
Fig. 7 is a similar view showing the action at the end of the heating period.
Figure 8:
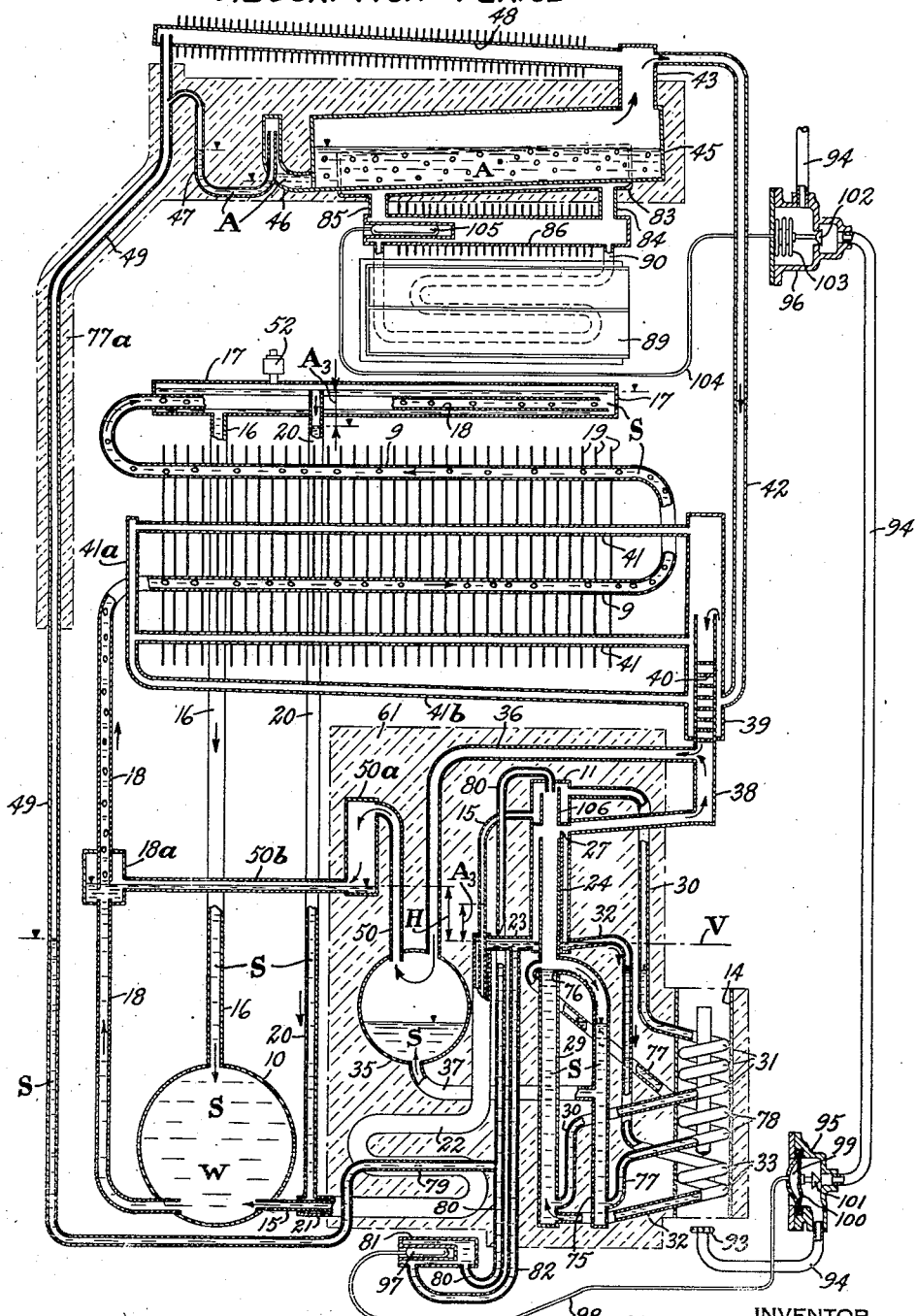
Fig. 8 is a similar view illustrating the action during the absorption period.

The pipe 20 is connected to an intermediate part of the vessel 17 and extends downwardly to connect with the outer pipe 21 of the heat exchanger 22. The other end of the heat exchanger is connected by a pipe 23 to the bottom part of chamber 24 within the member 25. Pipe 23 communicates with the outside space of the heat exchanger 22 which is in communication with the pipe 20. The tube 29 extends upwardly within member 25 to form the inner cylinder 26. A separate plate 27a is provided to prevent violent ebullition. This plate is not tight at the edges of the cylinder and extends across the member 25, providing two communicating vertical spaces of which the one is connected to pipe 23 and the other is connected to the pipe 32. Plate 27a may be perforated. This plate is merely a surge plate to keep the liquid quieter in the part of chamber 24 communicating with the tube 23 than that communicating with tube 32. The pipe 32 which is in part formed as a coil 33 around the heating member 14, is connected at the bottom to member 29. A down leg 75 is connected to column 29 at 76. It may be well to state that Figs. 6, 7 and 8 are diagrammatic showings of the structure shown in Figs. 2, 3, 4, 5 and 5a, and the manner of connecting the conduits, if not clear from the actual apparatus showing will be clear from the diagrammatic showing such as Fig. 6. Connected to the lower part of down leg 75 is a conduit 77 which is coiled around heating member 14 as a vapor-lift coil 78. This conduit extends upwardly and is connected to the column 29 at the level 76. The conduit 30 connects to the lower part of column 29 and is in heat exchange relation with the outside source of heat at 31 and extends upwardly and connects to the upper part of chamber 11. Member 31 is a vapor lift member as in Fig. 1. Volume variation vessel 35 is connected by means of conduits 36 and 37 with the conduit 38 and the lower part of tube 29 respectively. The rectifier is formed as in Fig. 1 by having the conduit 38 containing internal baffles 40 pass within conduit 39 which extends upwardly and to which condenser tubes 41 are connected. The bottom of conduit 39 is blocked off to hold a pool of liquid and conduit 42 is connected to the space between conduits 39 and 40 below the point of connection of a conduit 41b thereto, which latter conduit is a drain from the condenser pipes. The condenser comprises the horizontal tubes 41 which open into conduit 39 and which are connected at their other ends by conduit 41a which is also connected to conduit 41b.

The conduit 42 extends upwardly to within a flanged section 42a communicating with the dome 43 of the evaporator 45. The draining arrangement is the same as is shown in Fig. 1 and includes a U-tube 46 and a U-tube 47. The U-tube 47 opens within the U-tube 46 and the U-tube 47 is connected to a down flow conduit 49. Insulation 77a is provided around a part of conduit 49 to minimize its action as a condenser. Conduit 49 is connected with the dome 43 by means of the flanged conduit 48. Conduit 49 extends downwardly to substantially the lowermost part of the apparatus and thence upwardly in contact with the heat exchanger 22 at 79 and thence upwardly to connect with a conduit 80 which is connected between a thermostat bulb housing 81 and chamber 11. The conduit 49 is soldered or welded to the heat exchanger at 79 so as to be heated thereby. A conduit 82 is connected to chamber 24 and extends downwardly and is connected to bulb chamber 81.

The conduit 50 is connected to the top of vessel 35 and to a chamber 50a connected to pipe 50b, in turn connected to chamber 18a.

A pocket or chamber 83 is hermetically secured around the lower outside part of evaporator 45. Two tubes 84 and 85 extend downwardly therefrom and connect to horizontal tubes 86 having flanges 87 thereon disposed within the food space 71. A U-tube 88 extends downwardly from tube 86 and is bent under the bottom of ice freezing compartment 89. Zig-zag tubes 90 are branched off from tube 88 and are in close contact with the sides of ice freezing chamber 89. The pipes 84, 85, 86, 88 and 90 and the space between members 83 and 45 are connected and hermetically sealed and separate from the main system including the evaporator 45. This evaporator heat transfer system including tubes 86 contains a separate fluid such as methyl chloride. This system is partially filled with liquid so that the liquid can boil within the food space and the resulting vapor can rise and condense on the surface of evaporator 45 and fall down again by gravity. A thermostat well 91 is provided for the secondary system.

In the actual apparatus shown in Figs. 2 to 5a, the distance L between the center of member 18c and the lower center of reservoir 18 is 14¾". The apparatus has been operated with a charge of 6000 cc. of 27% solution of ammonia in water.

The apparatus is controlled by a thermostat bulb in the chamber 81 controlling the supply of heat and a thermostat bulb in well 91 controlling the supply of heat. The regulation will be described in connection with operation of the apparatus. The operation of the apparatus will be described with reference to Figs. 6, 7 and 8.

Fig. 6 is a diagrammatic showing of the apparatus shown in Figs. 2 to 5a inclusive, illustrating the action during the heating period. Although this is a diagrammatic showing, an operative refrigerator can be made according to this showing. The system is shown as heated by a gas burner 93 supplied with gas through conduit 94. The burner projects its flame into the flue 14 and the coils 31, 33 and 78 are positioned within the flue. A heat spreader may be provided in the flue when heating with gas or the coils may be replaced by straight inclined lengths of pipe. In the gas line 94 are two valves 95 and 96. Valve 95 is controlled by a bulb 97 situated within member 81. Bulb 97 is connected by a tube 98 to a chamber 99 within valve member 95, one side of which is formed by a flexible diaphragm or the like 100 to which is attached a valve 101 controlling flow through conduit 94.

Valve 96 includes a valve member 102 adapted to regulate flow through conduit 94 and connected with an expansible bellows or the like 103 communicating through a tube 104 with a bulb 105 situated in the pocket 91 extending into tube 86 of the evaporator structure. Each of the thermostat systems is partly filled with a volatile liquid. Valve 95 closes on rise of temperature and valve 96 opens on rise in temperature.

In the apparatus shown in Figs. 2-5a, the heaters were electric resistances but they were controlled by bulbs situated as shown in Fig. 6.

When the apparatus is first put into operation, all the parts are at atmospheric temperature. This is a low temperature for bulb 97 and therefore valve 95 is open. Likewise valve 96 is open because bulb 105 is at atmospheric temperature which is a relatively high temperature for this bulb. It is therefore only a question of turning on the gas by opening the main manual valve in the line and lighting the burner. The application of heat causes formation of vapor in each of the coils 31, 33 and 78. The coil 31 is the main absorption liquid circulating member. Strong liquid is withdrawn from the lower part of tube 29 and lifted due to the expulsion of vapor within coil 31 upwardly to the separating chamber 11. In these diagrammatic drawings the letter S stands for strong liquor or solution, namely, absorption liquid containing a relatively high percentage of refrigerant in solution. The letter W designates weak liquor. The letter A designates pure or substantially pure liquid ammonia.

Due to the expulsion of vapor in coil 31, the liquid is weakened and the weak liquor and refrigerant vapor flow upwardly through conduit 30 into chamber 11. In chamber 11, the gas and liquid are separated. The gas flows downwardly through the central tube 106 and into conduit 38. The weak liquid flows through conduit 15 and into the lower part of the reservoir 18. Strong liquid flows upwardly through conduit 16, through a part of chamber 17 and downwardly through conduit 20 to the outer space of the liquid heat exchanger 22. Thence the strong liquor flows through conduit 23 into chamber 24. The strong liquid is held up in chamber 24 due to the lifting action of coil 33 and its reacting liquid column in tube 29 and, due also to the circulation produced by vapor-lift 31, the liquid overflows the edge of the inner cylinder formed by tube 29. A level is maintained in tube 29 as indicated at the level 76. The connection of tube 75 to conduit 29 at the level 76 and the action of coil 78 result in an overflow of liquid to the lower level in tube 75. Liquid flowing downwardly in tube or leg 75 passes into conduit 77 and the vapor-lift member 78 causes the flow of this liquid upwardly through conduit 77 to the level 76 in tube 29. Some of the liquid issuing from tube 77 flows downwardly in the tube 29 and some flows over the dam at 76 into tube 75. Vapor-lift 78 thus lifts the liquid over the dam and maintains the level of liquid in tube 29 at the height 76. This maintains a constant head on the down leg of the vapor-lifts 31 and 33. From the lower part of tube 29, strong liquid passes into tube 30, thus completing the liquid circulation circuit whereby strong liquor is removed from the upper part of the storage vessel 10 and weak liquor is returned to the lower part thereof. The vapor-lift member 33 withdraws strong solution from the lower part of tube 29 and pumps it upwardly into chamber 24 to maintain liquid in chamber 24 up to the overflow. An analyzing effect is produced in the upper part of tube 29. The vapor passes upwardly through conduit 38 and is condensed in the condenser tubes 41 and thence it is forced upwardly into the evaporator. Gas passing up with the liquid is condensed in the condenser 48. Liquid must be supplied to the liquid circulation circuit during this period to make up for the refrigerant expelled. This liquid is supplied through conduit 37 from the volume variation vessel 35. The vapor-lift member 78 supplies this liquid to tube 29. Vapor-lift coil 78 pumps an excess amount of liquid for maintaining a constant level, the remainder overflowing into down leg 75.

The rate of circulation produced by a vapor-lift is affected by variations in pressure, since specific volume of vapor varies materially with variations in pressure, and by variations in height of liquid reaction column. A vapor-lift element so narrow as herein described wherein a gas bubble fills out the cross-section of the pipe is less subject to these variations than a wide pipe, but, nevertheless, is affected by them. In the system of the kind herein dealt with, the pressure varies. In a system as shown in Fig. 1, the reaction column of the vapor-lift varies. These effects are cumulative since the reaction column is higher when the pressure is low and circulation is increased by increase in reaction height and by decrease in pressure. Too fast a circulation slows up the rise of pressure to condensation pressure at the beginning of the heating period.

To counteract these influences, I combine the narrow vapor-lift with a constant reaction head. I relieve the vapor-lift circulator for the main circulation of absorption liquid of variations of surface level in the volume variation vessel and have provided a constant head in the down leg of the vapor-lift by lifting liquid from the volume variation vessel to the dam at the level 76 by means of the vapor-lift coil 78. This makes the pumping head independent of variations of surface level in vessel 35 and materially improves and stabilizes the circulation. Coil 78 itself will operate with a variable head, but this lifting member has so small a lifting height and can be so located and dimensioned that it always provides safe vapor-lift action even when the liquid surface in vessel 35 is low. Vapor-lift member 78 is designed to pump an excess of liquid to ensure that tube 29 is always filled with liquid, during this period, to the level 76. A constant head is also provided for vapor-lift member 33. It will be seen that liquid is lifted in a plurality of stages to chamber 11. Vapor-lift element 78 lifts the liquid from the level in vessel 35 to the level 76. Vapor-lift element 31 lifts the liquid from level 76 to chamber 11. By lifting the liquid in stages, the height of the expelling section of the apparatus can be reduced.

During this action, the liquid in pipes 80 and 82 is substantially stagnant. The level in vessel 50a is at an intermediate point between the level in chamber 11 and the level in chamber 24 due to resistance in the pipes. If the surface in vessel 50a is of substantial area, this vessel is preferably imbedded in insulation, as shown, so that it will be above condensation temperature, since this surface separates the expelled vapor from the cold liquid. This level is preferably maintained stagnant so as to cause minimum absorption of expelled vapor. The overflow at 27 tends to maintain stagnation in vessel 50a.

While the heating goes on, liquid is being condensed and accumulates in the evaporator 45. When the level in the evaporator rises to the level XI, the trap 47 overflows into conduit 49. Any absorption liquid (indicated by S in member 46) is first carried over. Pipe 49 contains strong liquid in the lower part thereof and as liquid overflows from the evaporator this strong liquid passes downwardly and into conduit 80. This liquid flows through conduit 80 downwardly and through member 81 and upwardly through conduit 82 into conduit 23. When a sufficient quantity of liquid has overflowed so that substantially pure ammonia enters the part of conduit 49 in heat exchange with the heat exchanger at 79, ammonia vapor is formed and enters pipe 80. The point 79 should be selected at so warm a part of the heat exchanger that vaporization of ammonia can readily take place. This vapor passes upwardly in pipe 80 and causes a circulation through member 81.

During the heating period, the surface level in conduit 49 is high as shown in Fig. 6. The column in pipe 49 balances the liquid column on the right-hand side of the apparatus (as shown in Fig. 6) below the overflow level at the top of chamber 24 plus the liquid column in conduit 42. It will be seen that the condenser should not be placed too low so as to increase the column 42 unduly, or else conduit 49 could carry absorption liquid into the evaporator. As shown, there is a substantial vertical distance between the overflow edge at 27 and the bottom of the liquid column in conduit 42.

We now turn to Fig. 7 showing the condition at the end of the heating period. We now have a condition wherein, due to the main continuous circulation of absorption liquid and such slow movement as takes place in other pipes, and due to diffusion, the entire body of absorption liquid except that contained in vessel 50a and in the lower part of volume variation vessel 35 and conduit 37 has been weakened. The pipe 49 contains substantially pure liquid ammonia which has overflowed from the evaporator. This ammonia is vaporized in heat exchange relation with the heat exchanger 22 at 79 and the vapor enters the pipe 80 and produces circulation of warm liquid from pipe 23 downwardly through pipe 82 through member 81 and upwardly through conduit 80, discharging into the gas liberation space of the heated or expulsion portion of the system. The liquid in conduit 23 at the point of withdrawal is relatively warm. The withdrawal may take place from chamber 24 or any other place containing relatively warm liquid. The warm liquid flowing in heat transfer relation with bulb 97 causes the same to rise in temperature. The expansion of fluid within bulb 97 results in expansion of the chamber 99 and a closing of valve 95. Thus the gas is shut off and the heating period ends and the absorption period is about to begin. The member 81 is not imbedded in the insulation and tends to remain at room temperature. The liquid circulated through the same due to the entry of ammonia vapor into pipe 80 raises the temperature materially, to, for example, 160° F. This is ample change in temperature to cause regulation of the heat supply. A snap action mechanism may be used so that valve 95 does not open on decrease of temperature until, for example, 125° F.

When the heat supply is shut off, the part within the insulation begins to cool down. Considerable cooling takes place in the coils 31, 33 and 78. Some ebullition will continue for a short period due to residual heat within the parts in the insulation. This is an advantage in bringing vapor out of residual hot liquid so that it can be absorbed and thus reduce the temperature and pressure thereof so that the absorption period may be quickly started. The pressure will drop from the high pressure of the expulsion or heating period to the low pressure of the absorption period very quickly due to the aforesaid absorption and since there is a very small amount of residual hot liquid at the end of the heating period.

As soon as some cooling has taken place and within a relatively short time after the burner is shut off, ebullition ceases in coil 33 wherefore the column in chamber 24 can no longer be maintained. The liquid in chamber 24 therefore falls to the level of the overflow in conduit 32 at V. The withdrawal of liquid into conduit 80 assists in or causes quick lowering of liquid in chamber 24.

We now turn to Fig. 8 showing the action during the absorption period. When the level falls to V there is a preponderance of pressure on the gas above the liquid in the generating portion of the system as explained in connection with Fig. 1. This preponderance of pressure is represented by the height H or some lesser value depending upon the regulation due to depression of liquid in vessel 17. The liquid lowers in vessel 50a, as explained in connection with Fig. 1 as to the liquid in conduit 50, and gas can now enter the conduit 18 through conduits 36, 50, 50a and 50b. The gas above the overflow is in gas communication with the surface in vessel 50a and therefore when the level is dropped in one branch the level will also drop in the other. The apparatus holds liquid up in conduits 18, 16 and 20 above the bottom opening of that part of conduit 18 which is within vessel 18a. The liquid will lower at the overflow in pipe 32 to a lower level and thus the liquid column in pipe 18 between the level of the opening in conduit 18 and the level V will cause a higher pressure on the gas whereby gas will be forced from the evaporator and from above the surface of residual hot liquid into the conduit 18.

The gas rises in conduit 18 and is absorbed in the absorber 9. A circulation is thus produced from the lower part of the reservoir 10 upwardly through conduit 18, through the absorber element 9 into vessel 17, and downwardly through conduit 16 back to the reservoir 10. Vessel 18a acts as a buffer to prevent hammer in the conduit due to gas pocketed therein. Such buffer chambers may be used wherever hammer or knocking is likely to take place. The withdrawal of vapor from above the surface of residual hot liquid causes expulsion of vapor within this liquid and a quick lowering of temperature and pressure is obtained. The weak liquid withdrawn from the lower part of reservoir 10 is enriched due to the addition of refrigerant gas thereto and the strong liquid accumulates in the upper part of reservoir 10, the dividing line between the strong liquor and the weak liquor gradually working downwardly therein.

Ebullition takes place in the evaporator 45 and this vessel is cooled to a very low temperature, for example, −20° F. At first the flow of gas through conduit 50 and into the absorption liquid circuit will be very fast. Too much gas may be supplied for the heat rejecting surface, and if this is the case, the gas will assemble in vessel 17 and press down the liquid in conduit 20 and raise the liquid in conduit 15 as indicated at $A_3$ to decrease the effective pumping height H as explained in connection with Fig. 1. The volume of liquid in the absorption liquid containing portion of the system is increased due to the absorption of refrigerant vapor and the increment flows from conduit 23 through conduit 32 into tube 29, upwardly in tube 29 and over the dam at 76 and through conduit 37 into the volume variation vessel 35. Thus the increase is taken care of in vessel 35. It will be noted that conduit 32 has flow in the opposite direction from that taking place during the heating period and may be said to be an overflow pipe for the increase in liquid due to absorption.

Since, at the beginning of the absorption period, the liquid column in pipe 42 has fallen down therefrom, the space above liquid in the members including chamber 24 imbedded in the insulation is in gas communication through member 48 at the top of the apparatus with conduit 49, and the level in these parts will equalize and thus the level in pipe 49 descends to a low point as shown in Fig. 8. When this point is reached there will be no further inflow of ammonia gas into conduit 80 and therefore flow will be stopped in the circuit 80, 81, 82. This gives the member 81 a chance to cool off again toward atmospheric temperature, and therefore valve 95 will open. However, in the meanwhile the evaporator has been reduced to a very low temperature, of, for example, −20° F., and consequently bulb 105 has been reduced in temperature and the contraction of fluid therein causes closing of valve 96, which is set to close at, for example, below 20° F. Therefore the opening of valve 95 does not turn on the heat again.

The evaporator 45 now acts as a condenser for fluid in the evaporator parts 83, 84, 86 and 90. The fluid therein is caused to vaporize due to heat supplied from the body to be cooled (both the food space and the ice trays), and it condenses on the outside surface of member 45 within the space provided by part 83. The condensate falls down and is again vaporized, since the temperature of member 45 is appreciably below the temperature of the evaporator section within the food space. Thus the cold is transferred from member 45 to the part to be cooled, or in other words, heat is extracted and refrigeration is produced. During the heating period, on the other hand, the gas in the upper part of the secondary system acts as an insulator for preventing transmission of heat from the evaporator 45 to the body to be cooled.

The absorption period continues until the liquid in the evaporator is substantially depleted, when the inflow of heat to the evaporator exceeds the heat removed by evaporation to such an extent that the evaporator temperature rises. When the evaporator temperature as indicated by bulb 105 rises to a predetermined value, of, for example, 20° F., the fluid within bulb 105 expands and causes an opening of valve 96. Since the valve 95 is now open the gas is supplied to the burner and the usual pilot light lights the flame and the heating period is again started.

From the foregoing it will be seen that the regulation of the system is preferably dependent on overflow of liquid from the evaporator and evaporation therein and independent of generator temperature. It has been customary to regulate by boiler temperature. If using overflow this is possible for a given condensing temperature, but a fixed condensing temperature is not obtained in practice. Particularly with air cooled apparatus, the cooling temperature varies appreciably. If the shutting off of the heat to the expeller is controlled by generator temperature, an amount of refrigerant will be expelled which has a relation to the temperature of the cooling source. Suppose, for example, that a bulb responsive to generator temperature is set to shut off the heat at a temperature of 250° F. and that it does this with a condenser temperature of 85° F. This necessitates a weak solution concentration of 25%. Suppose that under these conditions the evaporator is filled to overflow. Suppose now that the condenser temperature rises to 120° F. This means that at the same concentration the boiler temperature is about 290° F. and that the thermostat bulb would shut off the heat at a concentration of approximately 35%, thus giving approximately a 10% difference of concentration, which means that a materially less quantity of ammonia is driven from solution and the evaporator will be only partly filled and may receive very little ammonia. If, under the above assumptions, the system had been charged with a 40% solution, the concentration differential would be 5% at 120° F. against 15% at 85° F., or that the evaporator would be only one third filled at 120° F. Thus the heating period is very inefficient with respect to amount of ammonia driven out and the evaporator will not overflow. On the other hand, by utilizing the overflow itself to control the generator heating it is possible to drive over a maximum amount of refrigerant during each cycle.

With this mode of regulation, the evaporator will not necessarily be emptied at the end of the absorption period. The apparatus operates, so to speak, with an amount of liquid refrigerant stored in the evaporator during both heating and absorption periods when the outside temperature is high. This means that during hot days this refrigerant is withdrawn from the solution in vessel 10 and connected parts and that the apparatus operates with a concentration which suits the warmer outer condition. The higher the outside temperature, the greater the quantity of refrigerant which is stored. Thus the efficiency is high during varying outer conditions and is self-adjusting.

Figure 9:
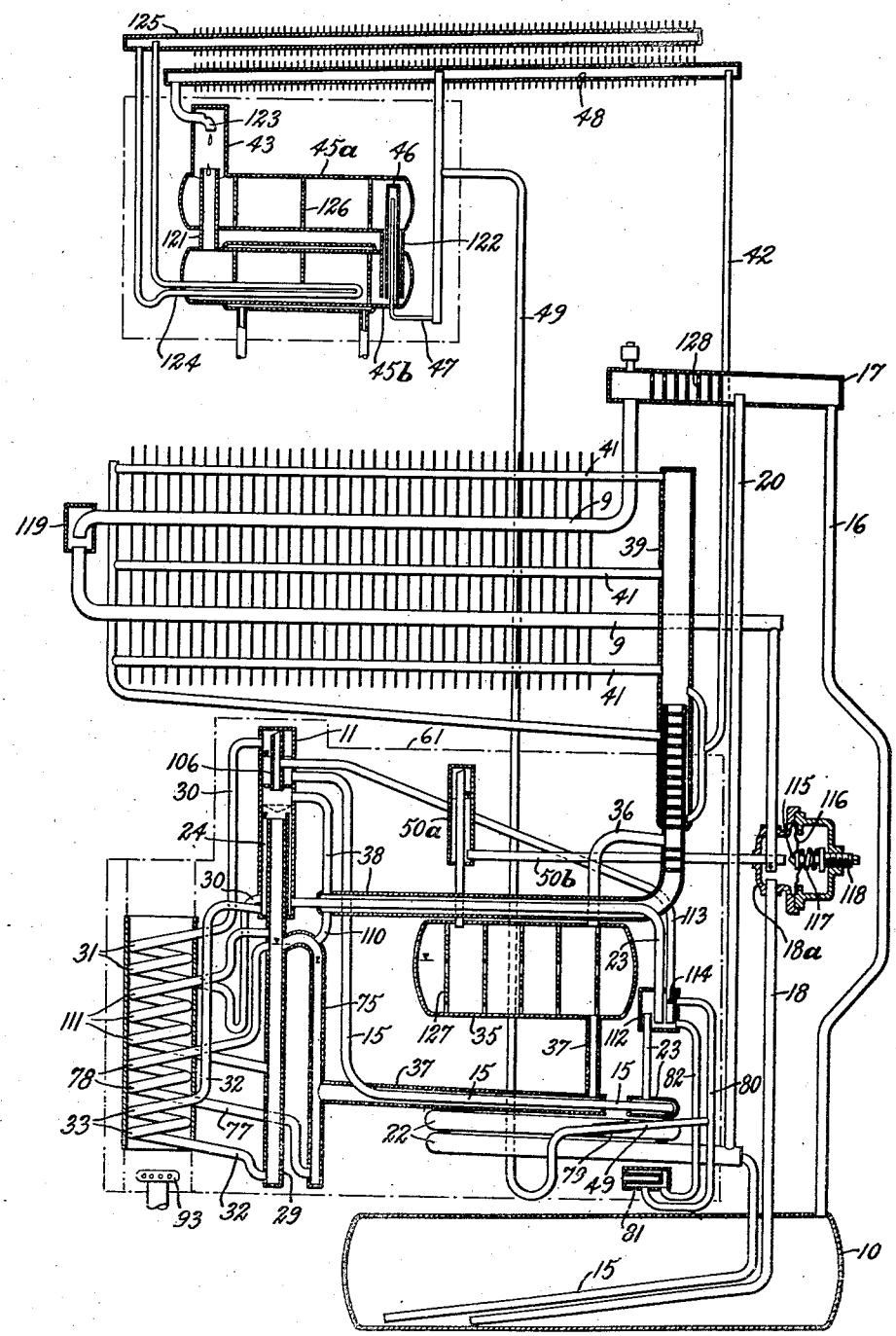
Fig. 9 shows another embodiment of features of the invention.

The system shown in Fig. 9 differs in some respects from the previously described systems. Like reference characters have been used to designate like parts and it will suffice to indicate the differences. The conduit 15 for flow of weak absorption liquid from chamber 11 to reservoir 10 is, in this embodiment, arranged in heat exchange relation with the conduit 37 before it forms a part of the heat exchanger 22 (considering direction of flow from chamber 11). During the expulsion period, liquid flows from the volume variation vessel 35 through conduit 37 into the branch or down leg 75. This liquid flows to the heated zone. The hot weak liquid flowing into conduit 15 therefore heats this liquid whereby the outside source of heat does not need to supply as much heat for warming up this liquid. This provides preheating of the volume differential of solution.

Conduit 23 passes within conduit 38. Conduit 38 conducts vapor from the generator to the condenser. The liquid flowing through conduit 23 is at an intermediate temperature and by the heat exchange relation with conduit 38, the warm rich solution therein serves to condense out entrained water vapor. The condensate flows through conduit 110 into the down leg 75. This conduit can, however, be connected to another part of the liquid containing portion of the system.

The liquid is lifted from tube 29 to chamber 11 in a plurality of steps. The coil 33 lifts the liquid into chamber 24 and conduit 30 is connected to this chamber so that vapor-lift coil 31 only needs to lift the liquid from chamber 24 to chamber 11. Coil 111 is a heating coil for adding further heat to the liquid from the source of heat. It will be noted that in all the embodiments the counter flow coil 33 is the lowest since it has the greatest load. Therefore it has the greatest counteracting column.

Conduit 82 withdraws liquid from a small receptacle 112 and the vapor admitted through conduit 49 into conduit 80 causes flow of liquid through member 81 and back into receptacle 112. Conduit 23 is broken within receptacle 112. A conduit 113 is connected to tube 106 in chamber 11 and extends within receptacle 112 and has an opening 114 therein. When vapor enters conduit 80 and rises upwardly into receptacle 112, it passes through hole 114 into pipe 113 and causes upward flow of liquid in pipe 113 into the vapor space above chamber 24. The upper part of conduit 23 is connected between chamber 24 and receptable 112 and this vapor causes a withdrawal of liquid from chamber 24. Thus, at the end of the heating period, the member 113 constitutes a positive means for pulling down liquid in chamber 24. As above stated, ebullition will continue after the heat is shut off due to residual heat in the warm parts, but the member 113 will cause the liquid to be pulled down in chamber 24 even though ebullition should continue in pipe 32.

Chamber 18a contains a valve 115 which is mounted on a diaphragm 116 and which is adapted to seat on the end of pipe 50b. A spring 117, adjustable by means of a screw 118, urges valve member 115 to closing position with respect to pipe 50b. It will thus be seen that the pressure within the system acts on one side of the diaphragm 116 while atmospheric pressure acts on the other side. Should the pressure within the system decrease, valve 115 will close more or less and allow less gas or vapor to pass into the liquid circulation circuit during the absorption period. Valve member 115 thus restricts the flow of gas into the absorption circuit and prevents too much gas entering thereinto. Valve member 115 is a temperature regulator since it tends to maintain constant evaporator pressure and temperature during absorption periods. During the expulsion period the pressure within the system is well above atmospheric pressure wherefore valve 115 is open.

A buffer chamber may be provided at 119.

The evaporator is made of two cylinders 45a and 45b connected by tubes 121 and 122. The inlet 123 to the evaporator is arranged over the tube 121 so that liquid falls first into the lower section 45b. As liquid fills this section it passes up through tube 122 and into the upper part. Within the lower part 45b is a tube 124 which is connected at its ends to a condenser 125. Parts 124 and 125 are separately hermetically sealed and are partly filled with a volatile liquid. The condenser 48 is under heavy load during the heating period and, unless made very large, cannot cool the refrigerant down to substantially the temperature of atmosphere surrounding the condenser. There is less load on the condenser 125 and this condenser can cool the condensate in vessel 45b to a lower temperature, thus precooling the accumulating liquid. Partitions 126 are disposed within the evaporator to prevent surges therein, particularly if the apparatus is used on a movable member, as a truck or a boat. For the same reason baffle members 127 are disposed within vessel 35. Baffle members 128 are also disposed within member 17, having central apertures to form a plurality of pools when gas therein depresses the liquid, whereby reabsorption can take place.

Figure 10:
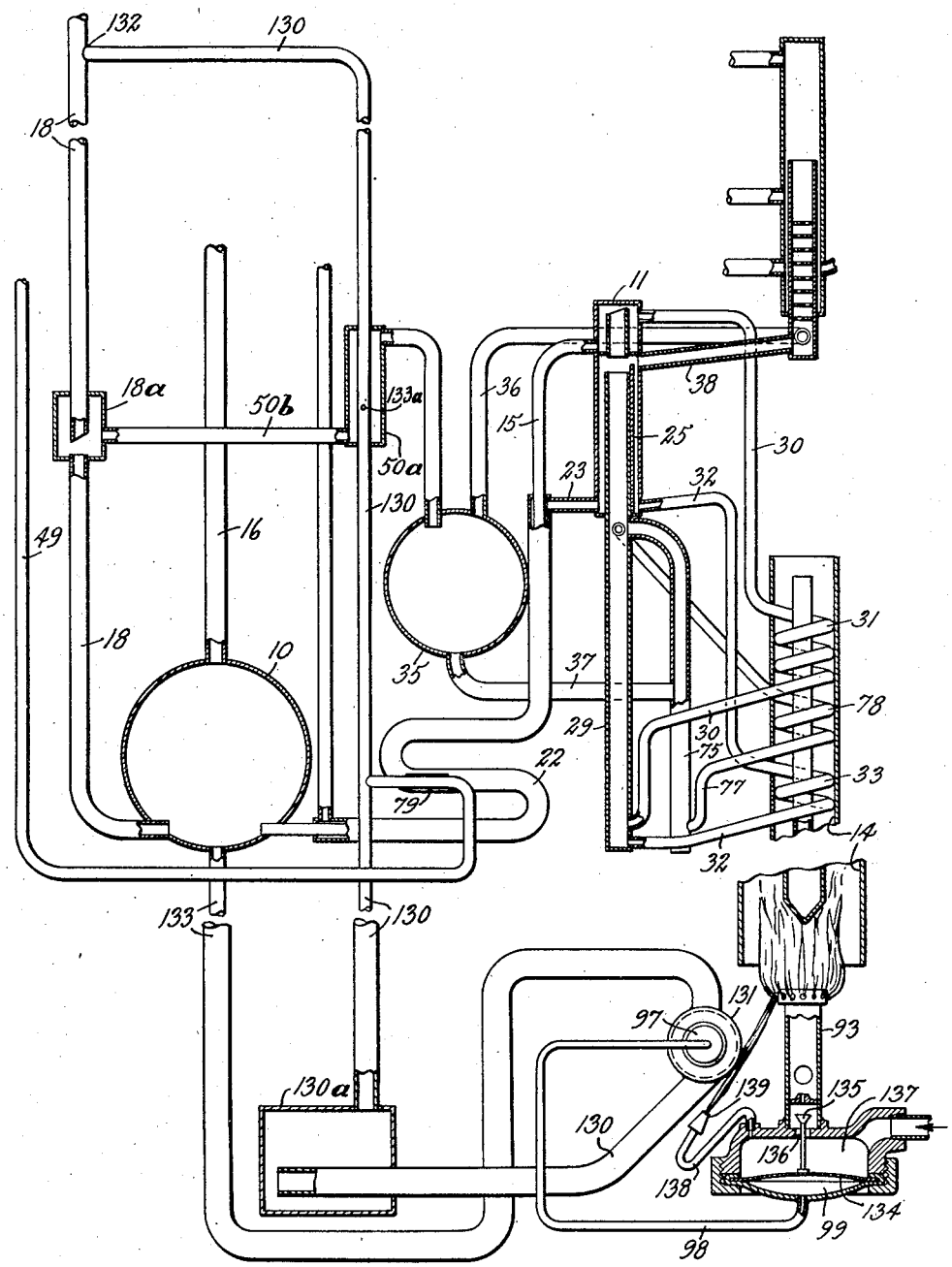
Fig. 10 shows a modified form of cycle regulation.

In Fig. 10, I have shown an apparatus for, and method of, regulation applicable to the apparatus as disclosed in the other figures. This form of regulation like that of Fig. 1, requires but one automatic valve in the gas supply line for complete cycle control. The apparatus shown is in general the same as shown in Fig. 6. The conduit 49 for overflow of liquid ammonia from the evaporator is in contact with the heat exchanger 22 at 79, so as to be heated, and connects with a pipe 130 extending between a thermostat bulb well member 131 and a point 132 in pipe 18 above the point of admission of gas thereto from the evaporator and the generator; namely above chamber 18a. This conduit 131 passes vertically through chamber 50a and has a hole 133a therein whereby gas from the evaporator can enter pipe 130 for producing circulation therein. A pipe 133 connects the bottom of reservoir 10 with the member 131. A bulb 97 connected by a tube 98 with a variable volume chamber 99 is situated within member 131. Chamber 99 is bordered by a diaphragm 134 which may be, and preferably is, a snap acting diaphragm. To this diaphragm is attached a valve member 135 controlling a port 136 for supplying gas to the burner 93 which heats the vapor-lift or generator coils of the system. Branched off from the gas line as from chamber 137 is a pilot line 138 having an orifice 139 so positioned as to direct the continuously burning pilot flame into contact with or so as to heat member 131 and also so as to light the burner 93.

The operation of the regulator shown in Fig. 10 is as follows:

Assume that vapor is formed in conduit 49 at the place 79 due to overflow of liquid refrigerant from the evaporator at the end of the heating period. The vapor enters tube 130 and produces circulation of liquid upwardly therein and downwardly through conduit 18 and/or conduit 16 to the bottom of reservoir 10 and from the bottom of reservoir 10 through conduit 133 to jacket 131 and thence back into conduit 130. This flow of liquid past the bulb 97 cools off this bulb despite its heating by the pilot flame. The cooling of the bulb due to the flow of liquid through conduit 133 and conduit 130 causes contraction of chamber 99 and the diaphragm 134 snaps valve 135 closed, thus shutting off the heat. This flow through conduits 133 and 130 will continue sufficiently long so that liquid will lower in vessel 50a and vapor be admitted from the generator and the evaporator through hole 133a into conduit 130. This admission of vapor through hole 133a causes continuance of circulation of cold liquid through member 131. So long as vapor passes from the evaporator through conduit 50 and conduit 50b, vapor will be supplied to hole 133 and circulation of cold liquid past member 131 will continue. When, however, evaporation stops in the evaporator or is materially slowed up, circulation in conduits 130 and 133 will stop or be insufficient to keep bulb 97 at low temperature and the continuance of the pilot flame against member 131 causes this member to heat and the temperature rises so that chamber 99 expands and valve 135 is again opened, whereupon the main burner 93 is lighted by the pilot flame and the heating period starts again.

When the circulation has stopped in conduits 130 and 133, the pilot flame produces vapor in member 131 wherefore the liquid therein is driven out and the temperature rises quickly. The liquid is driven out through pipe 130 and gas accumulates in the upper bend of conduit 133. I provide a chamber 130a in conduit 130 to take care of vapor passing into pipe 131 so that this vapor will not pass upwardly in conduit 130 and cause liquid circulation during the heating period. The conduits should be so arranged that a sufficient lifting action is produced in conduit 130 to overcome the liquid heads and resistances including that caused by vapor in the bend in conduits 130 and 133 in which the member 131 is placed.

Should the pilot flame go out, the bulb 97 will cool and the apparatus will stop, whereby the apparatus acts as a combined regulator and safety device.

Figure 11:
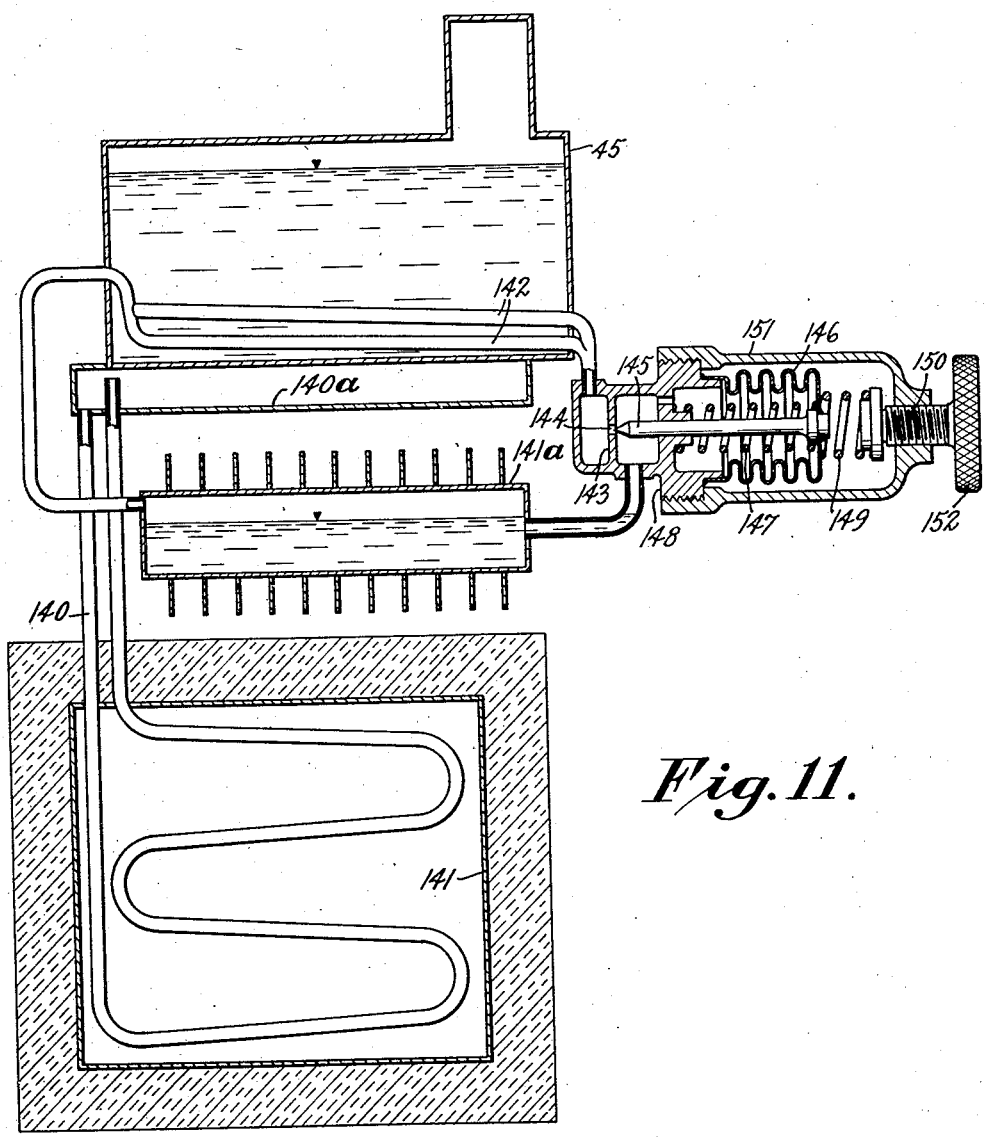
Fig. 11 shows an evaporator structure and regulation.
Figure 12:
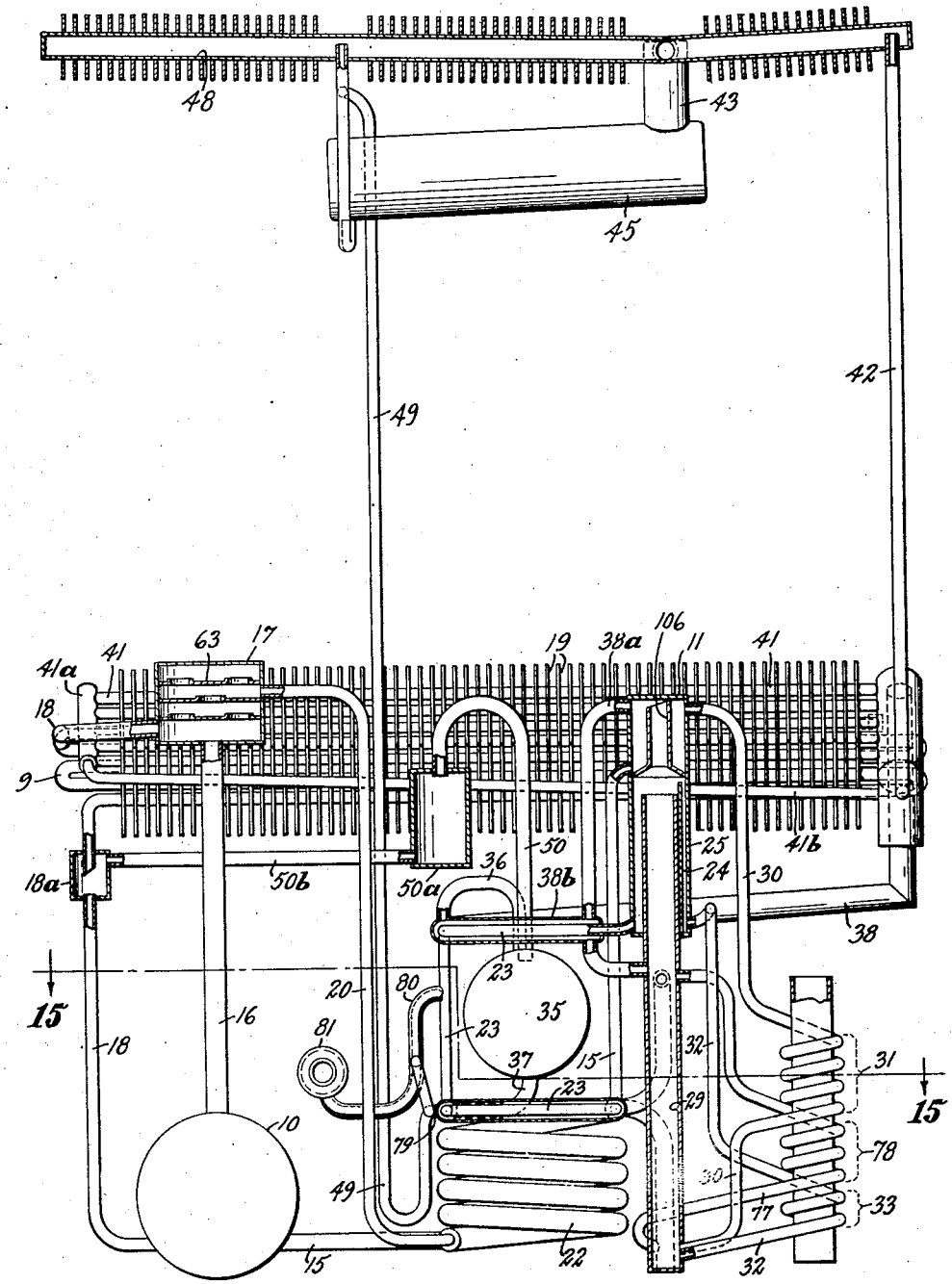
Figure 13:
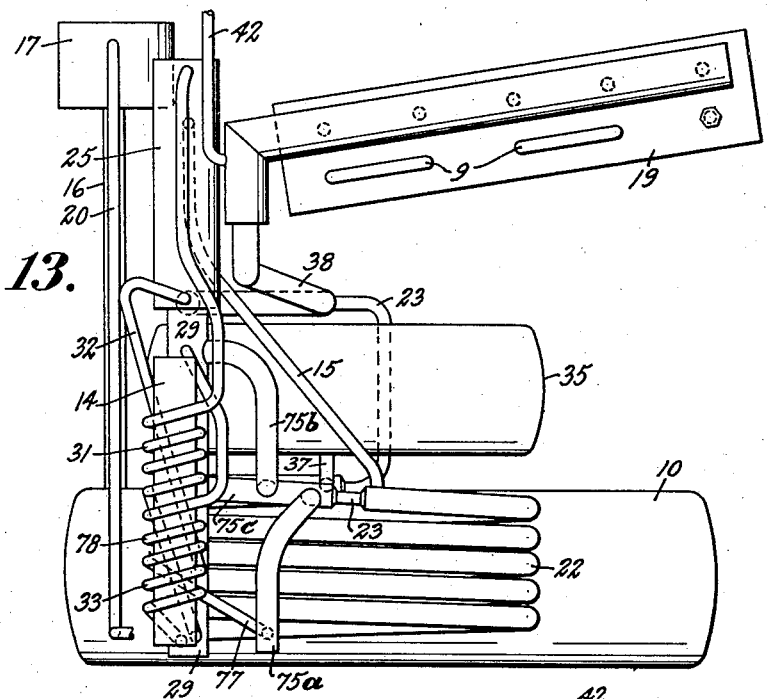
Figure 14:
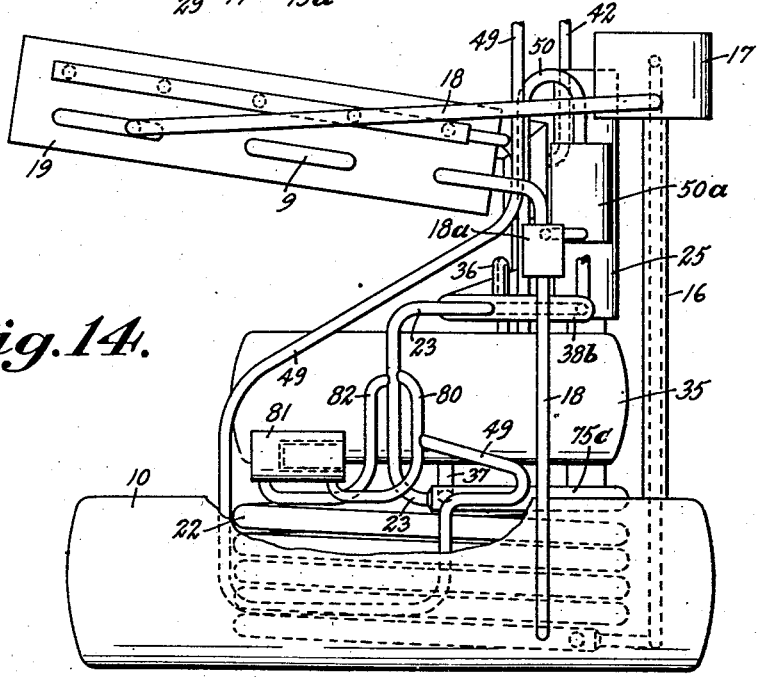

The arrangement shown in Fig. 10 provides a complete control of the cycles but will not give regulation of box temperature when the apparatus is applied to a refrigerating cabinet. To obtain control of box temperature an additional gas valve may be used responsive to box temperature to prolong heating periods, or an arrangement such as shown in Fig. 11 may be used. In the arrangement shown in Fig. 11 a depending loop or other structure 140 is provided which is connected to a jacket 140a in heat exchange relation with evaporator 45 and which is in direct heat transfer relation with a compartment 141 for holding ice cubes. Parts 140 and 140a are partly filled with a volatile fluid. This compartment may be insulated and extremely low temperatures in this part may be permitted. It is not necessary to regulate the temperature of the part for ice freezing. A separate hermetically sealed system is employed for cooling the food space. This comprises an evaporator section 141a having a tube 142 extending in heat transfer relation with the contents of evaporator 45. The tube 142 is a condenser for the evaporator member 141a. A valve member 151 is connected between members 141a and 142. Within member 151 is a partition 143 having an aperture 144 controlled by a valve stem 145 connected to a bellows or the like 146. The bellows is subject on the one side to pressure within members 141a and 142 and on the other side to atmospheric pressure. A spring 147 is provided abutting against the bellows 146 and against a fixed member 148. A spring 149 is provided between the bellows and a movable member 150 which may be screw-threaded into the casing 151. A manual knob 152 is provided for screwing member 150 longitudinally of casing 151. The valve in this system is in the nature of an ordinary expansion valve. It admits more liquid from tube 142 to the interior of member 141a as the pressure within bellows 146, and consequently members 142 and 141a, increases; and conversely, restricts the flow if the pressure decreases. The pressure on bellows 146 is a direct function of the temperature of member 141a and therefore this device tends to maintain a constant temperature of the member 141a. The spring force against the bellows 146 can be adjusted by the knob 152 and this member therefore provides a control for regulating the pressure, and consequently the temperature, at which member 141a is maintained.

Member 142 is of small volume relative to member 141a so that, when valve 151 is closed, the liquid condensed in member 142 will remain therein and fill the same to prevent further condensation. As more heat is supplied from the body to be cooled, the temperature of member 141a rises, opening the valve so that further condensation and evaporation can take place. Valve 151 may be a snap-acting valve. The main evaporator may be provided with cold accumulating means so that the transfer system 141a—142 may be active during part or the whole of the heating period as well as the absorption period.

Figs. 12 to 15 show another system embodying the invention. Like reference characters are applied to the various parts. In this embodiment, the condenser 41 and the absorber 9 are situated somewhat inclined from the horizontal and the apparatus, except for the evaporator and connecting conduits, is designed to be placed below a refrigerating cabinet. With a natural draft flue, this arrangement provides good draft and cooling.

The conduit 23, which constitutes the inside pipe of heat exchanger 22, extends through a conduit 75c to which conduit 37 is connected and to which conduits 75a and 75b are connected, which replace conduit 75 of previous embodiments. Thus conduit 23 serves to preheat liquid flowing from vessel 35 to the expeller. Conduit 23 also extends through a section 38b of conduit 38. A part 38a of conduit 38 is carried downwardly to meet conduit 23. Thus the rich liquor serves to analyze the vapor leaving the expeller. Conduits 80 and 82 are connected to conduit 23 at substantially the same level but I have found this to be satisfactory for operation of the thermostat. The remainder of the apparatus and its operation will be apparent from the foregoing description of other embodiments. The drawings of this apparatus are to scale. In the actual apparatus the distance from the bottom of tube 29 to the top of chamber 11 is 15½ inches.

A variation of the counter-lift is shown in Fig. 16. Tube 29 extends downwardly within an outer conduit 160, forming a space 161 therebetween. Conduit 32 has its upper end connected to space 161 and a conduit 162 connects this space with chamber 24. Conduit 162 is preferably provided with an inverted U-bend to delay downflow of liquid in case vapor is not supplied thereto at sufficient rate. Chamber 161 is closed at the top.

On application of heat to the counter-lift vapor-lift 33, liquid and gas flow upwardly in tube 32. The gas and liquid separate in chamber 161. The pipe 162 is so narrow that (disregarding surface film) gas cannot pass liquid. The gas depresses the liquid in chamber 161 and liquid is thereby held up in chamber 24. Equilibrium is established when the head H5 is equal to the head H6. When heat is removed from coil 33, the liquid in chamber 24 falls down into chamber 161.

Whereas the vapor-lift elements which absorb heat from the outside source are preferably so narrow that gas bubbles therein fill out the whole width, it is not necessary that the pipe 18 leading upwardly to the absorber element be of such narrow width, though it may be advisable to have a part thereof of such narrow width, particularly if the liquid is to be lifted above and fall to a surface of liquid. The apparatuses herein disclosed do not have a liquid column between the generator and the evaporator and the absorber circuit is such as to have very little resistance to flow and therefore it is possible to have a wider pipe in this circuit than would be necessary if there were a large opposing force. However, this pipe should be reasonably narrow so that adequate circulation is obtained through the absorber.

The pipe 20 need not necessarily be connected to the vessel 17 though this is preferred, but it might be connected to some other part of the absorber circuit such as the conduit 16 above the level R by at least the distance H.

The various vapor-lift elements may be heated by separate sources of heat and separately controlled.

It will be obvious that variations in structure may be made without departing from the spirit or scope of the invention and that various features may be used independently of others.

What I claim is:

1. In an absorption refrigeration system having low pressure periods of refrigerant evaporation and absorption alternating with higher pressure periods of vapor expulsion and condensation, an evaporator, an absorption liquid reservoir, an absorption liquid cooling element, conduits forming a liquid circulation circuit between said reservoir and said cooling element, means to conduct gas from said evaporator and introduce the same into said circuit at a given level during the absorption periods, a volume variation vessel, means to conduct liquid from said circuit to said volume variation vessel during the absorption periods including an overflow at a level below the first-mentioned level, and means to raise liquid at the overflow during the expulsion periods to above the first-mentioned level.

2. In an absorption refrigeration system having low pressure periods of refrigerant evaporation and absorption alternating with higher pressure periods of vapor expulsion and condensation, an evaporator, an absorption liquid reservoir, an absorption liquid cooling element, conduits forming a liquid circulation circuit between said reservoir and said cooling element, means to conduct gas from said evaporator and introduce the same into said circuit at a given level during the absorption periods, a volume variation vessel, means to conduct liquid from said circuit to said volume variation vessel during the absorption periods including an overflow at a level below the first-mentioned level, and a vapor-lift for raising liquid at the overflow during the expulsion periods to above the first-mentioned level.

3. In an absorption refrigeration system having low pressure periods of refrigerant evaporation and absorption alternating with higher pressure periods of vapor expulsion and condensation, an evaporator, absorption liquid containing structure, means to conduct gas from said evaporator and introduce the same into said structure at a given level during the absorption periods, a volume variation vessel, means to conduct liquid from said structure to said volume variation vessel during the absorption periods including an overflow at a level below the first-mentioned level, and means to raise liquid at the overflow during the expulsion periods to above the first-mentioned level.

4. In an absorption refrigeration system having low pressure periods of refrigerant evaporation and absorption alternating with higher pressure periods of vapor expulsion and condensation, an evaporator, absorption liquid containing structure, means to conduct gas from said evaporator and introduce the same into said structure at a given level during the absorption periods, a volume variation vessel, means to conduct liquid from said structure to said volume variation vessel during the absorption periods including an overflow at a level below the first-mentioned level, and a vapor-lift for raising liquid at the overflow during the expulsion periods to above the first-mentioned level.

5. In an absorption refrigeration system having low pressure periods of refrigerant evaporation and absorption alternating with higher pressure periods of vapor expulsion and condensation, an evaporator, a generator, absorption liquid containing structure, means to conduct gas from said evaporator and said generator and introduce the same into said structure at a given level during the absorption periods, a volume variation vessel separate from the generator and the structure, means to conduct liquid from said structure to said volume variation vessel during absorption periods including an overflow at a level below the first-mentioned level, and means to raise liquid at the overflow during the expulsion periods to above the first-mentioned level.

6. In an absorption refrigeration system having low pressure periods of refrigerant evaporation and absorption alternating with higher pressure periods of vapor expulsion and condensation, an evaporator, a generator, absorption liquid containing structure, means to conduct gas from said evaporator and said generator and introduce the same into said structure at a given level during the absorption periods, a volume variation vessel separate from the generator and the structure, means to conduct liquid from said structure to said volume variation vessel during absorption periods including an overflow at a level below the first-mentioned level, and a vapor-lift for raising liquid at the overflow during the expulsion periods to above the first-mentioned level.

7. In an absorption refrigeration system having low pressure periods of refrigerant evaporation and absorption alternating with higher pressure periods of vapor expulsion and condensation, an evaporator, absorption liquid containing structure, means to conduct gas from said evaporator and introduce the same into said structure at a given level during the absorption periods, a volume variation vessel, means to conduct liquid from said structure to said volume variation vessel during the absorption periods including an overflow at a level below the first-mentioned level, and a conduit including a vapor-lift for raising liquid at the overflow during the expulsion periods to above the first-mentioned level, the last-mentioned conduit having a downwardly inclined portion at the upper part thereof.

8. In an absorption refrigeration system having low pressure periods of refrigerant evaporation and absorption alternating with higher pressure periods of vapor expulsion, an absorption liquid reservoir, liquid containing structure above and connected to said reservoir, a heated zone, conduits for conducting refrigerant from the heated zone to the evaporator and from the evaporator to said structure and communicating with said structure at a given level, members providing a path of flow for absorption liquid from said reservoir, through the heated zone and back to said reservoir, and means to lift liquid in its path of flow to the heated zone during the expulsion periods to a level above the first-mentioned level and thereby cause liquid to enter the conduit for conducting refrigerant from the evaporator to said structure.

9. In an absorption refrigeration system having low pressure periods of refrigerant evaporation and absorption alternating with higher pressure periods of vapor expulsion and condensation, an evaporator, an absorption liquid reservoir, absorption liquid circulation members connected to said reservoir and extending thereabove, a heated zone, conduits for conducting refrigerant from the heated zone to the evaporator and from the evaporator to said circulation members and communicating therewith at a given level, members providing a path of flow of absorption liquid from said reservoir through the heated zone and back to said reservoir, and vapor-lift means to lift liquid in its path of flow to the heated zone during the absorption periods to a level above the first-mentioned level and thereby cause liquid to enter the conduit for conducting the refrigerant from the evaporator to said structure.

10. In an absorption refrigeration system having low pressure periods of refrigerant evaporation and absorption alternating with higher pressure periods of vapor expulsion and condensation, means to produce a liquid column head for forcing refrigerant gas into absorption liquid during the absorption periods, and means to lift liquid to form a liquid seal for cutting off access of vapor to said absorption liquid and to neutralize said head during the expulsion periods.

11. In an absorption refrigeration system having low pressure periods of refrigerant evaporation and absorption alternating with higher pressure periods of vapor expulsion and condensation, members providing circulation of absorption liquid in an endless circuit during absorption periods, means to introduce refrigerant vapor into said circuit, means to produce a liquid column head for forcing said refrigerant vapor into said circuit, and means to lift liquid to form a liquid seal for cutting off access of vapor to said absorption liquid and to neutralize said head during the expulsion periods.

12. In an absorption refrigeration system having low pressure periods of refrigerant evaporation and absorption alternating with higher pressure periods of vapor expulsion and condensation, an evaporator, an absorption liquid reservoir, an absorption liquid cooling element, conduits forming a liquid circulation circuit between said reservoir and said cooling element, means to conduct gas from said evaporator into said circuit during the absorption periods, a volume variation vessel, means to conduct liquid from said circuit to said volume variation vessel during the absorption periods including an overflow conduit, and means to reverse the flow in said overflow conduit during the expulsion periods.

13. In an absorption refrigeration system having low pressure periods of refrigerant evaporation and absorption alternating with higher pressure periods of vapor expulsion and condensation, an evaporator, an absorption liquid reservoir, an absorption liquid cooling element, conduits forming a liquid circulation circuit between said reservoir and said cooling element, means to conduct gas from said evaporator into said circuit during the absorption periods, a volume variation vessel, means to conduct liquid from said circuit to said volume variation vessel during the absorption periods including an overflow conduit, and vapor producing means to reverse the flow in said overflow conduit during the expulsion periods.

14. Absorption refrigeration system of the kind having periods of vapor expulsion alternating with periods of evaporation and absorption comprising a gas separation member, an evaporator communicating with said gas separation member, a volume variation vessel communicating with said gas separation member, an element communicating with said volume variation vessel and adapted to hold absorption liquid at a higher level than said gas separation member, said volume variation vessel being of sufficient volume to hold all the absorption liquid at any time held above the gas separation member so as to prevent passage of absorption liquid into the evaporator, and additional elements and conduits completing an absorption liquid portion and a refrigerant portion of the system.

15. In an absorption refrigeration system having low pressure periods of evaporation alternating with higher pressure periods of vapor expulsion, an absorption liquid storage reservoir, a volume variation vessel above said reservoir, a gas separation chamber above said volume variation vessel, an absorber element above said gas separation vessel connected to said reservoir, means to circulate liquid between said reservoir and said gase separation chamber, and means to connect said volume variation vessel with the other parts so that fluctuations of surface therein are isolated from the gas separation chamber and the reservoir.

16. In an absorption refrigeration system of the kind having low pressure periods of refrigerant evaporation and absorption alternating with higher pressure periods of vapor expulsion and condensation, an absorption liquid reservoir, members connected to said reservoir to form an absorption liquid circulation circuit, means to introduce refrigerant vapor into said circuit, a source of heat, members including a first vapor-lift member for circulating liquid between said reservoir and said source of heat, and a second vapor-lift member for raising liquid during expulsion periods to prevent introduction of refrigerant vapor into the absorption liquid circulation circuit.

17. In an absorption refrigeration system having low pressure periods of refrigerant evaporation and absorption alternating with higher pressure periods of vapor expulsion and condensation, an absorption liquid reservoir, members connected to said reservoir to form an absorption liquid circulation circuit, means to introduce refrigerant vapor into said circuit, a source of heat, members including a first vapor-lift member for circulating liquid between said reservoir and said source of heat, a second vapor-lift member for raising liquid during expulsion periods to prevent introduction of refrigerant vapor into the absorption liquid circulation circuit, and a third vapor-lift member for maintaining a constant head of liquid on the first and second vapor-lift members.

18. In an absorption refrigeration system having low pressure periods of refrigerant evaporation and absorption alternating with higher pressure periods of vapor expulsion and condensation, the improvement which consists in producing circulation of absorption liquid during the expulsion periods and circulation of absorption liquid during the absorption periods and raising a first portion of liquid to raise a second portion of liquid to form a seal between vapor and absorption liquid during generation periods, said circulation during the expulsion periods and said circulation during the absorption periods and said raising of liquid being all due to refrigerant vapor generated within the system.

19. In an absorption refrigeration system having low pressure periods of refrigerant evaporation and absorption alternating with higher pressure periods of vapor expulsion and condensation, and having a circulation circuit for absorption liquid during absorption periods, the improvement which consists in producing a liquid seal between generated vapor and the circulation circuit during expulsion periods due to application of heat to liquid and controlling the height of the seal by liquid overflow.

20. In an absorption refrigeration system having low pressure periods of refrigerant evaporation and absorption alternating with higher pressure periods of vapor expulsion and condensation, the improvement which consists in maintaining the bulk of absorption liquid cool during expulsion periods, producing a liquid seal between generated vapor and cool absorption liquid during expulsion periods due to the lifting effect of vapor on liquid, and controlling the height of the seal by liquid overflow.

21. In an absorption refrigeration system having low pressure periods of refrigerant evaporation and absorption alternating with higher pressure periods of vapor expulsion and condensation, the improvement which consists in maintaining the bulk of absorption liquid cool during expulsion periods, producing a liquid seal between generated vapor and cool absorption liquid during expulsion periods due to the lifting effect of vapor on liquid, controlling the height of the seal by liquid overflow, and passing generated vapor in contact with the overflowing liquid.

22. In an absorption refrigeration system having low pressure periods of refrigerant evaporation and absorption alternating with higher pressure periods of vapor expulsion and condensation, an absorption liquid storage vessel unheated during both expulsion and absorption periods, an absorber cooling element, means to circulate absorption liquid between said storage vessel and said cooling element during absorption periods, and means to vary liquid head for producing and varying vapor pressure to cause and regulate introduction of vapor into absorption liquid while maintaining continuity of circulation between the storage vessel and cooling element.

23. In an absorption refrigeration system having low pressure periods of refrigerant evaporation and absorption alternating with higher pressure periods of vapor expulsion and condensation, an absorption liquid reservoir, an excess vapor vessel, a plurality of conduits connecting said reservoir with said excess vapor vessel to form a circulation circuit for absorption liquid, vapor expelling means connected to said reservoir, said plurality of conduits being so connected in the system that accumulation of gas in the excess vapor vessel raises a counteracting column, and an additional conduit connected to the excess vapor vessel and so connected in the system that accumulation of gas in the excess vapor vessel forcing liquid downwardly in the last-mentioned conduit does not raise a counteracting column.

24. In an absorption refrigeration system having low pressure periods of refrigerant evaporation and absorption alternating with higher pressure periods of vapor expulsion and condensation, an absorption liquid circulation circuit, a volume variation vessel, and means for raising liquid upwardly from said volume variation vessel into said circuit.

25. In an absorption refrigeration system having low pressure periods of refrigerant evaporation and absorption alternating with higher pressure periods of vapor expulsion and condensation, an absorption liquid circulation circuit, a volume variation vessel, and vapor-lift means for raising liquid upwardly from said volume variation vessel into said circuit.

26. In an absorption refrigeration system having low pressure periods of refrigerant evaporation and absorption alternating with higher pressure periods of vapor expulsion and condensation, absorption liquid containing structure, means to introduce refrigerant vapor into said structure at a given level, a heated zone, means to conduct rich liquor to the heated zone, separate expelled refrigerant from absorption liquid and produce flow of weak liquor from the heated zone, and means to raise both the rich and weak liquor above said level.

27. In an absorption refrigeration system having low pressure periods of refrigerant evaporation and absorption alternating with higher pressure periods of vapor expulsion and condensation, absorption liquid containing structure, means to introduce refrigerant vapor into said structure at a given level, a heated zone, means to conduct rich liquor to the heated zone, separate expelled refrigerant from absorption liquid and produce flow of weak liquor from the heated zone, and vapor-lift means to raise both the rich liquor and the weak liquor above said level.

28. In an absorption refrigeration system having low pressure periods of refrigerant evaporation and absorption alternating with higher pressure periods of vapor expulsion and condensation, an expulsion section comprising a plurality of vapor-lift lift members discharging at different elevations, the discharge points of the vapor-lift members being at equal pressure and means whereby at least one vapor-lift member operates under a constant reaction head and another vapor-lift member operates under a variable head.

29. In an absorption refrigeration system having low pressure periods of refrigerant evaporation and absorption alternating with higher pressure periods of vapor expulsion and condensation, means providing an overflow of liquid at a given elevation, absorption liquid containing structure, means to admit refrigerant gas to said structure above said elevation, and a volume variation vessel below said elevation.

30. In an absorption refrigeration system having low pressure periods of refrigerant evaporation and absorption alternating with higher pressure periods of vapor expulsion and condensation, members providing a circulation circuit for absorption liquid during absorption periods, means to admit refrigerant vapor to said circuit at a given level, and means for maintaining a substantially constant surface level of liquid below the point of admission of vapor to the circulation circuit for producing a preponderance of pressure on the refrigerant vapor to cause it to flow into the circulation circuit.

31. In an absorption refrigeration system having low pressure periods of refrigerant evaporation and absorption alternating with higher pressure periods of vapor expulsion and condensation, a gas and liquid separator, a volume variation vessel, and means to raise liquid above the volume variation vessel and into said separator during expulsion periods under a constant reactive head irrespective of variations of surface level in the volume variation vessel.

32. In an absorption refrigeration system having low pressure periods of refrigerant evaporation and absorption alternating with higher pressure periods of vapor expulsion and condensation, a first vapor-lift member for circulating liquid, a second vapor-lift member for producing a liquid seal, and a third vapor-lift member for maintaining a constant counteracting liquid column on the first and second vapor-lift members.

33. In an absorption refrigeration system having low pressure periods of refrigerant evaporation and absorption alternating with higher pressure periods of vapor expulsion and condensation, a first vapor-lift member for circulating liquid, a second vapor-lift member for producing a liquid seal, a third vapor-lift member for maintaining a constant counteracting liquid column on the first and second vapor-lift members, and a common source of heat for said first, second and third vapor-lift members.

34. In an absorption refrigeration system having low pressure periods of refrigerant evaporation and absorption alternating with higher pressure periods of vapor expulsion and condensation, a first vapor-lift member for circulating liquid, a second vapor-lift member for producing a liquid seal, a third vapor-lift member for maintaining a constant reaction head on the first vapor-lift member and the second vapor-lift member, and a fourth vapor-lift member for expelling vapor from solution.

35. In an absorption refrigeration system having low pressure periods of refrigerant evaporation and absorption alternating with higher pressure periods of vapor expulsion and condensation, an evaporator, a main condenser below said evaporator, an overflow pipe, and an auxiliary condenser above said evaporator and connected to said main condenser and said overflow pipe.

36. In an absorption refrigeration system having low pressure periods of refrigerant evaporation and absorption alternating with higher pressure periods of vapor expulsion and condensation, a reservoir for absorption liquid, a source of heat, members providing a circuit for circulation of absorption liquid between said reservoir and said source of heat, a heat exchanger in said circuit, and a liquid overflow in said circuit between the heat exchanger and the source of heat.

37. In an absorption refrigeration system having low pressure periods of refrigerant evaporation and absorption alternating with higher pressure periods of vapor expulsion and condensation, an absorption liquid reservoir, a vapor-lift member adapted to be heated, members providing a circuit for rich and weak liquor between said reservoir and said vapor-lift, said circuit including a liquid heat exchanger, and a liquid overflow in the path of rich liquor between the heat exchanger and the vapor-lift member.

38. In an absorption refrigeration system having low pressure periods of refrigerant evaporation and absorption alternating with higher pressure periods of vapor expulsion and condensation, an absorption liquid reservoir, a heated zone, means to conduct liquid in a circuit between the reservoir and the heated zone, a volume variation vessel, means to conduct liquid from the volume variation vessel into said circuit, and means to conduct weak liquor from the heated zone first in heat exchange relation with liquid leaving the volume variation vessel and then in heat exchange relation with liquid passing from the reservoir to the heated zone.

39. In a refrigerating system having low pressure evaporation periods alternating with higher pressure expulsion periods, absorption liquid containing structure, an evaporator, means to conduct vapor from said evaporator to said structure, and valve structure in the last-mentioned means movable in response to pressure within the system for controlling flow of liquid therethrough.

40. In a refrigerating system having low pressure evaporation periods alternating with higher pressure expulsion periods, a source of heat, temperature responsive means to control the source of heat operative to shut off the heat at atmospheric temperature, means for continuously applying heat to said temperature responsive means, and means responsive to flow of vapor to cool said temperature responsive means.

41. In a refrigerating system having low pressure evaporation periods alternating with higher pressure expulsion periods, the improvement which consists in cooling absorption liquid during heating periods, circulating cool absorption liquid at the end of the heating period, applying heat to maintain heat supply, and shutting off heat supply due to said circulation of cool absorption liquid.

42. Absorption refrigerating apparatus including a vapor expulsion component, members forming a circuit having an upflow conduit and a downflow conduit connected at high elevation above said vapor expulsion component, means to admit gas into said upflow conduit and means to control admission of gas while maintaining circulation in said circuit.

43. Absorption refrigerating apparatus including a vapor expulsion component, members forming a circuit having an upflow conduit and a downflow conduit connected at high elevation above said vapor expulsion component, means to admit gas to said upflow conduit, and an additional conduit connected to said circuit for regulating the admission of gas.

44. An absorption refrigeration system having low pressure periods of refrigerant evaporation and absorption alternating with higher pressure periods of vapor expulsion and condensation and including a vapor expulsion component, a liquid storage vessel, means to circulate liquid between said expulsion component and said vessel, an absorber element, means to circulate liquid between said storage vessel and said absorber element, an evaporator, means to supply heat to the expulsion component, means dependent on control of heat supply to flow refrigerant from the expulsion component to the evaporator and from the evaporator to the absorber element for the respective periods, a single control member for controlling the supply of heat, and a manually controlled heat transfer system between the evaporator and the body to be cooled.

45. An absorption refrigeration system having low pressure periods of refrigerant evaporation and absorption alternating with higher pressure periods of vapor expulsion and condensation and including a vapor expulsion component, a liquid storage vessel, means to circulate liquid between said expulsion component and said vessel, an absorber element, means to circulate liquid between said storage vessel and said absorber element, an evaporator, means to supply heat to the expulsion component, means dependent on control of heat supply to flow refrigerant from the expulsion component to the evaporator and from the evaporator to the absorber element for the respective periods, a single control member for controlling the supply of heat, and an indirect transfer system between the evaporator and the body to be cooled.

46. An absorption refrigeration system having low pressure periods of refrigerant evaporation and absorption alternating with higher pressure periods of vapor expulsion and condensation and including a vapor expulsion component, a liquid storage vessel, means to circulate liquid between said expulsion component and said vessel, an absorber element, means to circulate liquid between said storage vessel and said absorber element, an evaporator, means to supply heat to the expulsion component, means dependent on control of heat supply to flow refrigerant from the expulsion component to the evaporator and from the evaporator to the absorber element for the respective periods, a single control member for controlling the supply of heat, and a vaporization-condensation member for transfer of heat between the body to be cooled and the evaporator.

47. An absorption refrigeration system having low pressure periods of refrigerant evaporation and absorption alternating with higher pressure periods of vapor expulsion and condensation and including a vapor expulsion component, a liquid storage vessel, means to circulate liquid between said expulsion component and said vessel, an absorber element, means to circulate liquid between said storage vessel and said absorber element, an evaporator, means to supply heat to the expulsion component, means dependent on control of heat supply to flow refrigerant from the expulsion component to the evaporator and from the evaporator to the absorber element for the respective periods, a single control member for controlling the supply of heat, and an automatically controlled heat transfer system between the body to be cooled and the evaporator.

48. An absorption refrigeration system having low pressure periods of refrigerant evaporation and absorption alternating with higher pressure periods of vapor expulsion and condensation and including a vapor expulsion component, a liquid storage vessel, means to circulate liquid between said expulsion component and said vessel, an absorber element, means to circulate liquid between said storage vessel and said absorber element, an evaporator, means to supply heat to the expulsion component, means dependent on control of heat supply to flow refrigerant from the expulsion component to the evaporator and from the evaporator to the absorber element for the respective periods, a single control member for controlling the supply of heat, a vaporization-condensation member for transfer of heat between the body to be cooled and the evaporator, and manually adjustable automatic means to control said heat transfer member.

49. In an absorption refrigeration system having low pressure periods of refrigerant evaporation alternating with higher pressure periods of refrigerant expulsion, the improvement which consists in alternately condensing and absorbing refrigerant vapor due to variations in heat supply, and varying heat supply solely due to flow of refrigerant vapor in the system.

50. In an absorption refrigerating system having low pressure periods of evaporation and absorption alternating with higher pressure periods of vapor expulsion, an absorption period liquid circulation circuit, means to introduce gas thereinto during absorption periods, an expulsion period liquid circulation circuit connected to said absorption period circuit, means to produce circulation in said expulsion period circuit, and means to produce a liquid column acting on said expulsion period circuit to prevent admission of gas to said absorption period circuit during expulsion periods.

51. In an absorption refrigerating system having low pressure periods of evaporation and absorption alternating with higher pressure periods of vapor expulsion, an absorption liquid structure, means to introduce gas thereinto during absorption periods, an expulsion period liquid circulation circuit connected to said structure, heat absorbing means to produce circulation in said circuit, and heat absorbing means to produce a force acting on said circuit to prevent admission of gas to said structure during expulsion periods.

52. In an absorption refrigerating system having low pressure periods of evaporation and absorption alternating with higher pressure periods of vapor expulsion, an absorption liquid structure, means to introduce gas thereinto during absorption periods, an expulsion period liquid circulation circuit connected to said structure, vapor producing means to produce circulation in said circuit, and vapor producing means to produce a force acting on said circuit to prevent admission of gas to said structure during expulsion periods.

53. In an absorption refrigerating system having low pressure periods of evaporation and absorption alternating with higher pressure periods of vapor expulsion, an absorption period liquid circulation circuit, means to introduce gas thereinto during absorption periods, an expulsion period liquid circulation circuit connected to said absorption period circuit, means to produce circulation in said expulsion period circuit, and means to produce a liquid column differential acting on and through said expulsion period circuit to prevent admission of gas to said absorption period circuit during expulsion periods.

54. In an absorption refrigerating system having low pressure periods of evaporation and absorption alternating with higher pressure periods of vapor expulsion, an absorption liquid structure, means to introduce gas thereinto during absorption periods, an expulsion period liquid circulation circuit connected to said structure, vapor producing means to produce circulation in said circuit, and vapor producing means to produce a liquid column differential acting on and through said circuit to prevent admission of gas to said structure during expulsion periods.

55. In an absorption refrigeration system having low pressure periods of refrigerant evaporation and absorption alternating with higher pressure periods of vapor expulsion, means to produce a liquid column head for forcing refrigerant gas into absorption liquid during the absorption periods, heat receiving means for neutralizing said head during expulsion periods, and a volume variation vessel having stagnant liquid therein and at lower temperature than said heat receiving means.

56. In an absorption refrigeration system having low pressure periods of refrigerant evaporation and absorption alternating with higher pressure periods of vapor expulsion and condensation, an absorption liquid containing structure, a conduit for conducting refrigerant vapor to said structure during absorption periods, and means to raise a first liquid portion during expulsion periods and thereby cause a second liquid portion to rise in said conduit to prevent flow of vapor.

57. In an absorption refrigeration system having low pressure periods of refrigerant evaporation and absorption alternating with higher pressure periods of vapor expulsion and condensation, an absorption liquid containing structure, a conduit for conducting refrigerant vapor to said structure during absorption periods, and means including a vapor-lift member to raise a first liquid portion during expulsion periods and thereby raise a second liquid portion in said conduit to prevent flow of vapor.

58. In an absorption refrigeration system having low pressure periods of refrigerant evaporation and absorption alternating with higher pressure periods of vapor expulsion and condensation, an absorption liquid component, an evaporator, a conduit for flow of vapor from said evaporator to said component, and means to raise liquid exteriorly of said conduit to induce rise of liquid into said conduit to prevent flow of gas therethrough.

59. In an absorption refrigeration system having 'ow pressure periods of refrigerant evaporation and absorption alternating with higher pressure periods of vapor expulsion and condensation, that improvement which consists in raising a first body of liquid and thereby causing rise of a second body of liquid to prevent entry of refrigerant vapor into absorption liquid during expulsion periods and lowering the first body of liquid to lower the second body of liquid to allow flow of vapor into absorption liquid during absorption periods.

60. In an absorption refrigeration system having low pressure periods of refrigerant evaporation and absorption alternating with higher pressure periods of vapor expulsion and condensation, that improvement which consists in employing heat to raise a first body of liquid and thereby causing rise of a second body of liquid to prevent entry of refrigerant vapor into absorption liquid during expulsion periods and removing the heat to cause lowering of the first body of liquid to thereby lower the second body of liquid to allow flow of vapor into absorption liquid during absorption periods.

61. In an absorption refrigeration system having low pressure periods of refrigerant evaporation and absorption alternating with higher pressure periods of vapor expulsion and condensation, that improvement which consists in controlling flow of vapor by rise and fall of a portion of liquid induced by rise and fall of a different portion of liquid respectively.

62. In refrigerating apparatus, the improvement which consists in regulating rate of flow of refrigerant vapor into absorption liquid at a given level by raising and lowering liquid laterally of the point of entry of the vapor into the absorption liquid.

63. In an absorption refrigeration system having low pressure periods of refrigerant evaporation and absorption alternation with higher pressure periods of vapor expulsion and condensation, and having a circulation circuit for absorption liquid during absorption periods, the improvement which consists in producing a liquid seal between generated vapor and the circulation circuit during expulsion periods due to application of heat to liquid and controlling the height of the seal by liquid overflow of circulating liquid while maintaining the sealing liquid stagnant.

64. In an absorption refrigeration system having low pressure periods of refrigerant evaporation and absorption alternating with higher pressure periods of vapor expulsion and condensation, and having a circulation circuit for absorption liquid during absorption periods, the improvement which consists in producing a liquid seal between generated vapor and the circulation circuit during expulsion periods due to application of heat to liquid and controlling the height of the seal by overflow of liquid separate from the sealing liquid.

65. In an absorption refrigeration system having low pressure periods of refrigerant evaporation and absorption alternating with higher pressure periods of vapor expulsion and condensation, and having a circulation circuit for absorption liquid during absorption periods, the improvement which consists in producing a liquid seal between generated vapor and the circulation circuit during expulsion periods due to application of heat to liquid and controlling the height of the seal by liquid overflow laterally of the sealing liquid and at substantially the elevation of the surface of the sealing liquid.

66. In an absorption refrigeration system having low pressure periods of refrigerant evaporation and absorption alternating with higher pressure periods of vapor expulsion and condensation, the improvement which consists in maintaining the bulk of absorption liquid cool during expulsion periods, producing a liquid seal between generated vapor and cool absorption liquid during expulsion periods due to the lifting effect of vapor on liquid, and controlling the height of the seal by liquid overflow of circulating liquid while maintaining the sealing liquid stagnant.

67. In an absorption refrigeration system having low pressure periods of refrigerant evaporation and absorption alternating with higher pressure periods of vapor expulsion and condensation, the improvement which consists in maintaining the bulk of absorption liquid cool during expulsion periods, producing a liquid seal between generated vapor and cool absorption liquid during expulsion periods due to the lifting effect of vapor on liquid, and controlling the height of the seal by overflow of liquid separate from the sealing liquid.

68. In an absorption refrigeration system having low pressure periods of refrigerant evaporation and absorption alternating with higher pressure periods of vapor expulsion and condensation, the improvement which consists in maintaining the bulk of absorption liquid cool during expulsion periods, producing a liquid seal between generated vapor and cool absorption liquid during expulsion periods due to the lifting effect of vapor on liquid, and controlling the height of the seal by liquid overflow laterally of the sealing liquid and at substantially the elevation of the surface of the sealing liquid.

69. Absorption refrigerating apparatus including a circuit having an upflow conduit and a downflow conduit connected at a first elevation, means to admit gas to said circuit at a second lower elevation, and means to regulate admission of gas to said circuit at variable rate while maintaining circulation in said circuit including an overflow above said second elevation.

70. In an absorption refrigeration system having low pressure periods of refrigerant evaporation and absorption alternating with higher pressure periods of vapor expulsion and condensation, members forming a first circuit having an upflow conduit and a downflow conduit, a gas and liquid separation member, members connected to said separation member forming a second circuit connected to said first circuit, means to admit gas to said first circuit, and said circuits being so connected as to control admission of gas to the first circuit in accordance with relative variation of liquid levels in both circuits.

71. In an absorption refrigeration system having low pressure periods of refrigerant evaporation and absorption alternating with higher pressure periods of vapor expulsion and condensation, an absorption liquid storage member, a vessel above said storage member, an upflow conduit and a downflow conduit connecting said vessel with said storage member to form a circulation circuit for absorption liquid, means to admit gas to said circuit, and means including a conduit connected to said vessel and extending below said vessel for variably controlling admission of gas to said circuit.

72. In an absorption refrigeration system having low pressure periods of refrigerant evaporation and absorption alternating with higher pressure periods of vapor expulsion and condensation, an absorption liquid storage member, a vessel above said storage member, an upflow conduit and a downflow conduit connecting said vessel with said storage member to form a circulation circuit for absorption liquid, means to admit gas to said circuit, an expulsion component, a liquid heat exchanger connected to said expulsion component, and conduits connecting said heat exchanger with said storage member and said vessel.

73. In an absorption refrigeration system having low pressure periods of refrigerant evaporation and absorption alternating with higher pressure periods of vapor expulsion and condensation, means to expel refrigerant from solution and condense the expelled refrigerant during expulsion periods and to evaporate and absorb refrigerant during absorption periods, means to automatically transfer between periods due to control of heat supply, and means to control heat supply due solely to flow of refrigerant vapor in the system.

74. In an absorption refrigeration system having low pressure periods of evaporation and absorption alternating with higher pressure periods of vapor expulsion, an absorption period liquid circulation circuit, means to introduce gas thereinto during absorption periods, an expulsion period liquid circulation circuit connected to said absorption period circuit, and heat absorbing means to produce circulation in said expulsion period circuit and to produce a force acting on said expulsion period circuit to prevent admission of gas to said absorption period circuit during expulsion periods.

75. In an absorption refrigeration system having low pressure periods of evaporation and absorption alternating with higher pressure periods of vapor expulsion, an absorption period liquid circulation circuit, means to introduce gas thereinto during absorption periods, an expulsion period liquid circulation circuit connected to said absorption period circuit, and vapor producing means to produce circulation in said expulsion period circuit and to produce a force acting on said expulsion period circuit to prevent admission of gas to said absorption period circuit during expulsion periods.

76. In an absorption refrigeration system having low pressure periods of evaporation and absorption alternating with higher pressure periods of vapor expulsion, an absorption period liquid circulation circuit, means to introduce gas thereinto during absorption periods, an expulsion period liquid circulation circuit connected to said absorption period circuit, and heat absorbing means to produce circulation in said expulsion period circuit and to produce a liquid column acting on said expulsion period circuit to prevent admission of gas to said absorption period circuit during expulsion periods.

77. In an absorption refrigeration system having low pressure periods of evaporation and absorption alternating with higher pressure periods of vapor expulsion, an absorption period liquid circulation circuit, means to introduce gas thereinto during absorption periods, an expulsion period liquid circulation circuit connected to said absorption period circuit, and vapor producing means to produce circulation in said expulsion period circuit and to produce a liquid column acting on said expulsion period circuit to prevent admission of gas to said absorption period circuit during expulsion periods.

78. In an absorption refrigeration system having low pressure periods of refrigerant evaporation and absorption alternating with higher pressure periods of vapor expulsion and condensation, a vessel in which volume of liquid varies dependent on quantity of refrigerant expelled from solution, a gas and liquid separation member, means including a vapor lift member for circulating liquid through the separation member, and means for maintaining a constant reaction head for the vapor-lift member irrespective of variation of quantity of liquid in said vessel.

79. In an absorption refrigeration system having low pressure periods of refrigerant evaporation and absorption alternating with higher pressure periods of vapor expulsion and condensation, a vessel in which volume of liquid varies dependent on quantity of refrigerant expelled from solution, a gas and liquid separation member, means including a vapor lift member for circulating liquid through the separation member and a down-leg for the lift, and overflow means for maintaining a constant height of liquid in the down-leg.

80. In an absorption refrigeration system having low pressure periods of refrigerant evaporation and absorption alternating with higher pressure periods of vapor expulsion and condensation, a vessel in which volume of liquid varies dependent on quantity of refrigerant expelled from solution, a vapor-lift circulator including an up-leg and a down-leg, and means to lift liquid from said vessel to said down-leg and overflow liquid at a given level of the down-leg to maintain a constant liquid head on the vapor-lift.

81. In an absorption refrigeration system having low pressure periods of refrigerant evaporation and absorption alternating with higher pressure periods of vapor expulsion and condensation, a vessel in which volume of liquid varies dependent on quantity of refrigerant expelled from solution, a first vapor-lift circulator including an up-leg and a down-leg, and a second vapor-lift circulator to lift liquid from said vessel to said down-leg and overflow liquid at a given level of the down-leg to maintain a constant liquid head on said first vapor-lift.

CARL GEORG MUNTERS.